United States Patent
Gasking

(10) Patent No.: US 11,036,182 B2
(45) Date of Patent: *Jun. 15, 2021

(54) HOLOGRAM LOCATION

(71) Applicant: 8i Limited, Wellington (NZ)

(72) Inventor: Lincoln Gasking, Beaverton, OR (US)

(73) Assignee: 8i Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,869

(22) Filed: Dec. 13, 2019

(65) Prior Publication Data

US 2020/0117137 A1    Apr. 16, 2020

Related U.S. Application Data

(63) Continuation of application No. 15/489,001, filed on Apr. 17, 2017, now Pat. No. 10,545,456.

(51) Int. Cl.
G03H 1/08 (2006.01)
G02B 27/01 (2006.01)
(Continued)

(52) U.S. Cl.
CPC .......... G03H 1/08 (2013.01); G02B 27/0103 (2013.01); G02B 27/0179 (2013.01);
(Continued)

(58) Field of Classification Search
None
See application file for complete search history.

(56) References Cited

U.S. PATENT DOCUMENTS 10,545,456 B2   1/2020  Gasking
10,671,241 B1*  6/2020  Jia ........................... H04L 67/38
(Continued)

FOREIGN PATENT DOCUMENTS

CN       110869982 A      3/2020
WO    WO-2018193305 A1   10/2018

OTHER PUBLICATIONS

U.S. Appl. No. 15/489,001, filed Apr. 17, 2017, Hologram Location.
(Continued)

*Primary Examiner* — Jennifer D. Carruth
(74) *Attorney, Agent, or Firm* — Schwegman Lundberg & Woessner, P.A.

(57) ABSTRACT

A machine is configured to perform hologram location within a scene to be generated. The machine accesses target motion data that describes movement of a target device. Based on the target motion data, the machine determines a target motion vector that indicates a target speed of the target device and indicates a target direction in which the target device is moving. The machine determines a hologram motion vector for a hologram to be generated for display by a user device. The hologram motion vector indicates a relative speed of the hologram and indicates a relative direction of movement for the hologram. The machine then causes the user device to generate a scene in which the hologram moves at a speed determined based on the target speed and on the relative speed, as well as moves in a direction determined based on the target direction and on the relative direction.

20 Claims, 14 Drawing Sheets

(51) Int. Cl.
  *G03H 1/26*  (2006.01)
  *G03H 1/00*  (2006.01)
  *G06T 19/00* (2011.01)

(52) U.S. Cl.
  CPC ............ *G03H 1/0005* (2013.01); *G03H 1/26* (2013.01); *G06T 19/006* (2013.01); *G02B 2027/014* (2013.01); *G02B 2027/0138* (2013.01); *G03H 2001/0088* (2013.01); *G03H 2210/62* (2013.01); *G03H 2226/02* (2013.01); *G03H 2226/05* (2013.01)

(56) References Cited

U.S. PATENT DOCUMENTS

| | | | | |
|---|---|---|---|---|
| 2013/0222371 | A1* | 8/2013 | Reitan | G09G 3/003 345/419 |
| 2015/0188984 | A1 | 7/2015 | Mullins | |
| 2015/0241221 | A1 | 8/2015 | Colby | |
| 2018/0108179 | A1 | 4/2018 | Tomlin et al. | |
| 2018/0299828 | A1 | 10/2018 | Gasking | |
| 2019/0392213 | A1* | 12/2019 | Ulbricht | G06T 7/70 |
| 2020/0098173 | A1* | 3/2020 | McCall | A63F 13/26 |
| 2020/0319704 | A1* | 10/2020 | Kathuria | H04N 13/344 |

OTHER PUBLICATIONS

"European Application Serial No. 18733664.9, Response filed May 26, 2020 to Communication pursuant to Rules 161(2) and 162 EPC dated Nov. 26, 2019", 28 pgs.

"U.S. Appl. No. 15/489,001, Non Final Office Action dated Mar. 8, 2019", 13 pgs.

"U.S. Appl. No. 15/489,001, Notice of Allowance dated Sep. 18, 2019", 7 pgs.

"U.S. Appl. No. 15/489,001, Response filed Jan. 4, 2018 to Restriction Requirement dated Nov. 9, 2018", 11 pgs.

"U.S. Appl. No. 15/489,001, Response filed Sep. 3, 2019 to Non-Final Office Action dated Mar. 8, 2019", 12 pgs.

"U.S. Appl. No. 15/489,001, Restriction Requirement dated Nov. 9, 2018", 6 pgs.

"Fused Technology—A technology platform that revolutionizes mixed-reality training with a quantum leap beyond virtual and augmented reality", Systems Technology, Inc., [Online] Retrieved from the internet: <http://www.systemstech.com/simulationproducts/fused-reali ty/>, (2016), 1-3.

"International Application Serial No. PCT/IB2018/000484, International Search Report dated Aug. 16, 2018", 4 pgs.

"International Application Serial No. PCT/IB2018/000484, Written Opinion dated Aug. 16, 2018", 6 pgs.

* cited by examiner

GEOLOCATIONS AND MOTION VECTORS

HOLOGRAM LOCATION

PRIORITY APPLICATION

This application is a continuation of and claims priority to U.S. patent application Ser. No. 15/489,001, filed Apr. 17, 2017, the disclosure of which is incorporated herein in its entirety by reference.

TECHNICAL FIELD

The subject matter disclosed herein generally relates to the technical field of special-purpose machines that facilitate computer-generated imagery, including software-configured computerized variants of such special-purpose machines and improvements to such variants, and to the technologies by which such special-purpose machines become improved compared to other special-purpose machines that facilitate computer-generated imagery (e.g., within an augmented reality scene, or virtual reality scene, or both). Specifically, the present disclosure addresses systems and methods to facilitate hologram location.

BACKGROUND

A machine may be configured to interact with one or more users by generating and displaying an augmented reality scene or a virtual reality scene (e.g., in response to user input, such as user input that causes movement of the machine), or causing another machine (e.g., a user device) to generate and display the augmented reality scene or virtual reality scene. For example, the machine may be a user device (e.g., a tablet computer or a smart phone) with a display screen and a video camera, and the machine may be configured to generate live video with the video camera, generate some computer graphics (e.g., one or more computer-generated images), and cause a display screen to display a composited scene in which the computer graphics are superimposed upon the live video. Such a composited scene may be referred to as an augmented reality scene. Alternatively, if live video is omitted or otherwise absent from the composited scene, the composited scene may be referred to as a virtual reality scene.

BRIEF DESCRIPTION OF THE DRAWINGS

Some embodiments are illustrated by way of example and not limitation in the figures of the accompanying drawings.

DETAILED DESCRIPTION

Figure 1:
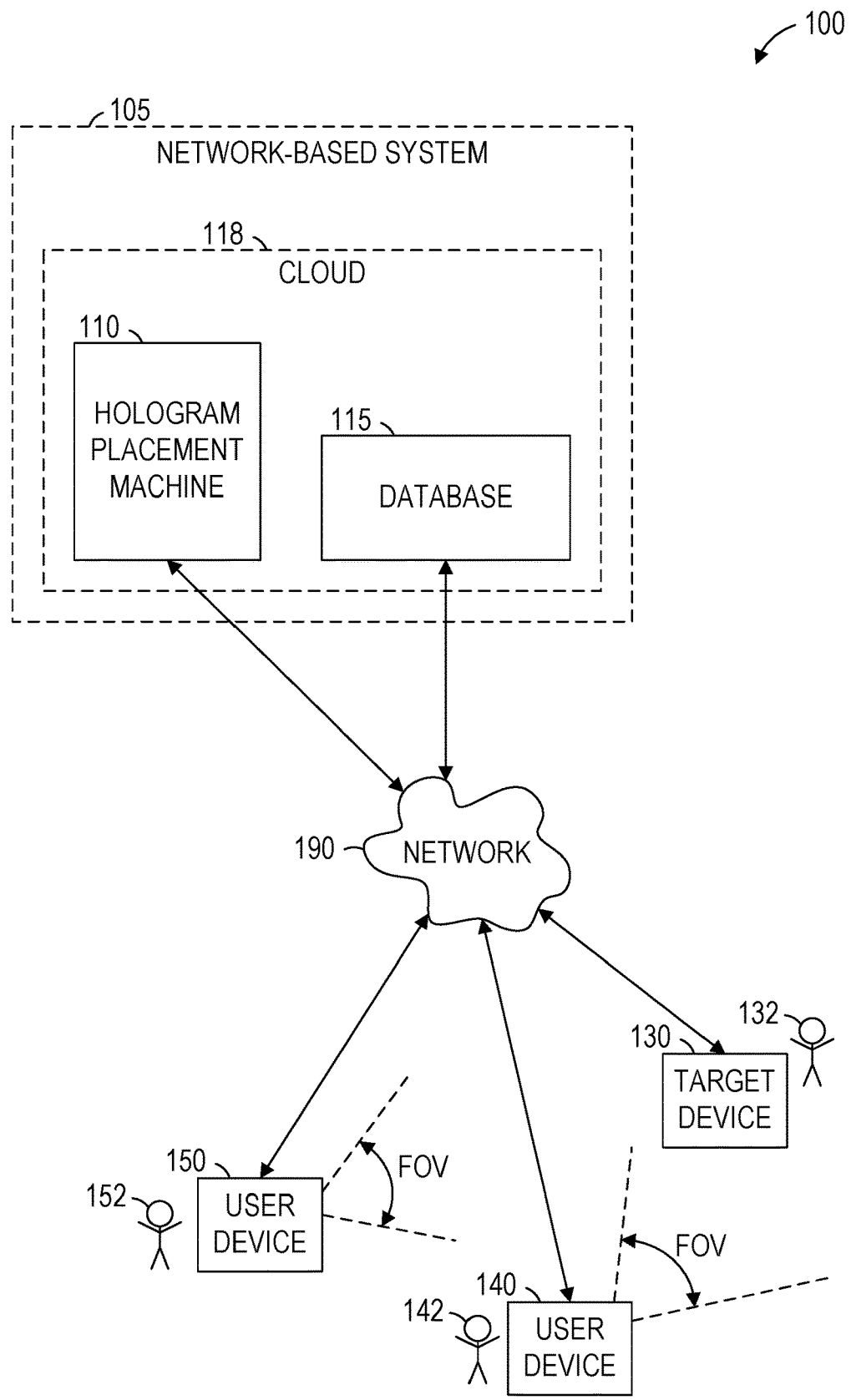
FIG. 1 is a network diagram illustrating a network environment suitable for hologram location, according to some example embodiments.

Example methods (e.g., algorithms) facilitate hologram location, and example systems (e.g., special-purpose machines configured by special-purpose software) are configured to facilitate hologram location. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server machine or a user device) may be configured to perform hologram location within a scene (e.g., an augmented reality scene or a virtual reality scene) to be generated for display by a user device (e.g., a viewing device). The placement of a hologram at a location within the scene may include determining the position (e.g., a geolocation, as indicated by global positioning system (GPS) coordinates, for example) of the hologram with respect to a target device, determining the speed of movement of the hologram with respect to the target device, determining the direction of movement of the hologram with respect the target device, determining the orientation of the hologram with the respect to the target device, or any suitable combination thereof. For example, any one or more of such determinations may be performed based on the position (e.g., geolocation) of the target device, the speed of movement of the target device, the direction of movement of the target device, or any suitable combination thereof.

As configured, the machine accesses target motion data that describes geolocation movement of the target device. Based on the target motion data, the machine determines (e.g., calculates or generates) a target motion vector that indicates a target speed of the target device. The target motion vector also indicates a target direction in which the target device is moving, at the target speed. Based on the target motion vector, the machine then determines a hologram motion vector for each hologram to be generated for display by a user device (e.g., viewing device). The hologram motion vector indicates a relative speed of a corresponding hologram (e.g., relative to the target device or relative to the user device), and indicates a relative direction of the corresponding hologram (e.g., relative to the target device or relative to the user device).

Based on the hologram motion vector, the machine causes the user device to generate a scene (e.g., augmented reality scene) in which the hologram moves at a speed (e.g., hologram speed) that is determined based on the target speed of the target device and based on the relative speed of the hologram (e.g., as indicated by the hologram motion vector). Furthermore, within the scene, the hologram moves in a direction (e.g., hologram direction) that is determined based on the target direction of the target device and based on the relative direction of the hologram (e.g., as indicated by the hologram motion vector).

According to various example embodiments, this may have the effect of determining the speed and direction in which a target device and its user are moving (e.g., walking) within the field of view of a user device, in order to then locate (e.g., place) and orient one or more holograms at or around the target device. For example, in a generated scene, a hologram of a science-fiction character (e.g., Darth Vader) may be located (e.g., placed) at the location of the target device (e.g., encapsulating and obscuring the target device and its user) and oriented in the direction in which the target device is moving, while holograms of science-fiction soldiers (e.g., stormtroopers) may be located at offset locations near the target device (e.g., walking behind Darth Vader) and oriented in the same direction in which the target device is moving. As another example, a city bus may be or include the target device, and the generated augmented reality scene may place holograms of birds, insects, or dragons at various offset locations behind and above the city bus. According to various example embodiments, such holograms may be dynamically updated (e.g., animated) to chase the city bus by flying in the same direction in which the city buses traveling. Moreover, the holograms in the generated scene may be animated in accordance with individual or group flight patterns (e.g., chaotic swarming or flying in formation).

As used herein, the term "hologram" refers to a machine-performed rendering of a virtual three-dimensional object in a three-dimensional environment. The virtual three-dimensional object may be or include a three-dimensional model (e.g., with or without texture mapping, such as one or more texture-mapped images), a three-dimensional cloud of points (e.g., a point cloud, with or without texture mapping), a three-dimensional volume of voxels (e.g., a voxel grid), or any suitable combination thereof. The three-dimensional environment (e.g., three-dimensional space) in which the three-dimensional object is rendered may be or include an augmented reality scene, a virtual reality scene, or both.

Once rendered, the virtual three-dimensional object is visible in the three-dimensional environment and appears to be occupying a portion of the three-dimensional environment (e.g., when a user views the three-dimensional environment using a viewing device, such as a smartphone or virtual reality goggles). Accordingly, rendering the virtual three-dimensional object may be referred to as generating the corresponding hologram (i.e., generating the rendering of the virtual three-dimensional object).

Furthermore, a hologram may be static (e.g., non-animated or otherwise motionless over time) or dynamic (e.g., animated or otherwise changing over time with respect to shape, size, color, brightness, transparency, location, orientation, or any suitable combination thereof). For example, a hologram may be or include a dynamic three-dimensional model of an animal or a person (e.g., a celebrity or a fictional character) that performs a series of movements (e.g., by the person's arms, legs, hands, or face) over a duration of time (e.g., with or without one or more corresponding audio tracks).

FIG. 1 is a network diagram illustrating a network environment 100 suitable for hologram location, according to some example embodiments. The network environment 100 includes a hologram placement machine 110, a database 115, a target device 130, and user devices 140 and 150 (e.g., viewing devices), all communicatively coupled to each other via a network 190. The hologram placement machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the any one or more of the target device 130 and the user devices 140 and 150). The hologram placement machine 110, the target device 130 and the user devices 140 and 150 may each be implemented in a special-purpose (e.g., specialized) computer system, in whole or in part, as described below with respect to FIG. 14.

Also shown in FIG. 1 are users 132, 142, and 152. Any one or more of the users 132, 142, and 152 may be a human user (e.g., a human being), a machine user (e.g., a robot or a computer configured by a software program to interact with a device), or any suitable combination thereof (e.g., a human assisted by a machine or a machine supervised by a human). The user 132 is associated with the target device 130 and may be a human user of the target device 130. For example, the target device 130 (e.g., with an integrated geolocation sensor, such as a GPS receiver) may be a desktop computer, a vehicle computer, a tablet computer, a navigational device, a portable media device, a smart phone, or a wearable device (e.g., a smart watch, smart glasses, smart clothing, or smart jewelry) belonging to the user 132. Similarly, the user 142 is associated with the user device 140 (e.g., a viewing device, with or without an integrated geolocation sensor) and may be a human user of the user device 140. As examples, the user device 140 may be a desktop computer, a vehicle computer, a tablet computer, a navigational device, a portable media device, a smart phone, or a wearable device (e.g., a smart watch, smart glasses, smart clothing, or smart jewelry) belonging to the user 142. Likewise, the user 152 is associated with the user device 150 and may be a human user of the user device 150. As examples, the user device 150 (e.g., another viewing device, with or without an integrated geolocation sensor) may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 14, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the hologram placement machine 110 and the target device 130, or between the target device 130 and the user device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
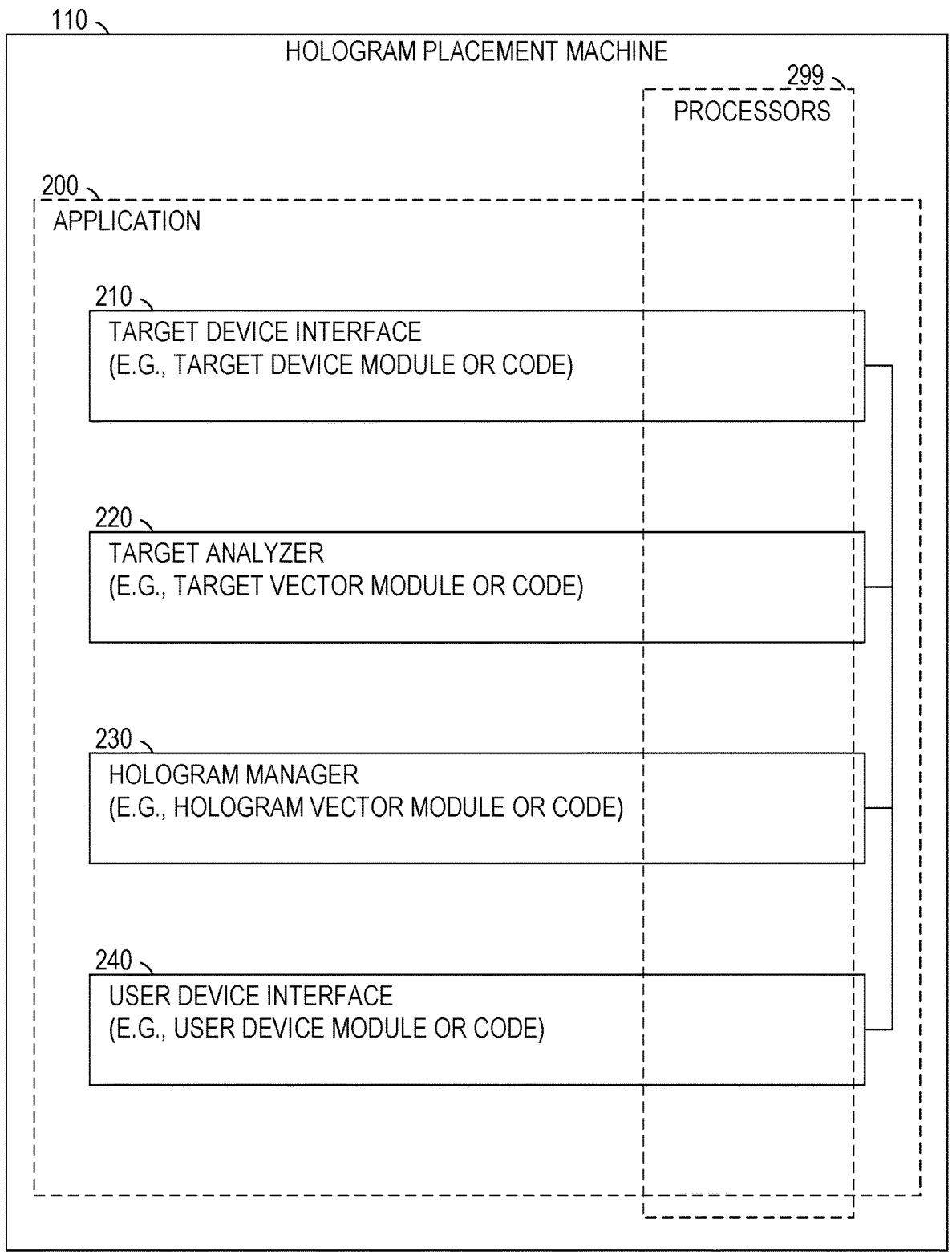
FIG. 2 is a block diagram illustrating components of a hologram placement machine suitable for hologram location, according to some example embodiments.

FIG. 2 is a block diagram illustrating components of the hologram placement machine 110, according to some example embodiments. The hologram placement machine 110 is shown as including a target device interface 210, a target analyzer 220, a hologram manager 230, and a user device interface 240, all configured to communicate with each other (e.g., via a bus, shared memory, or a switch). Accordingly, in certain example embodiments, the hologram placement machine 110 is configured to perform one or more the methodologies described herein.

As shown in FIG. 2, the target device interface 210, the target analyzer 220, the hologram manager 230, the user device interface 240, or any suitable combination thereof, may form all or part of an application 200 (e.g., a software program) that is stored (e.g., installed) on the hologram placement machine 110 (e.g., responsive to or otherwise as a result of data being received from the database 115). Furthermore, one or more processors 299 (e.g., hardware processors, digital processors, or any suitable combination thereof) may be included (e.g., temporarily or permanently) in the application 200, the target device interface 210, the target analyzer 220, the hologram manager 230, the user device interface 240, or any suitable combination thereof.

Figure 3:
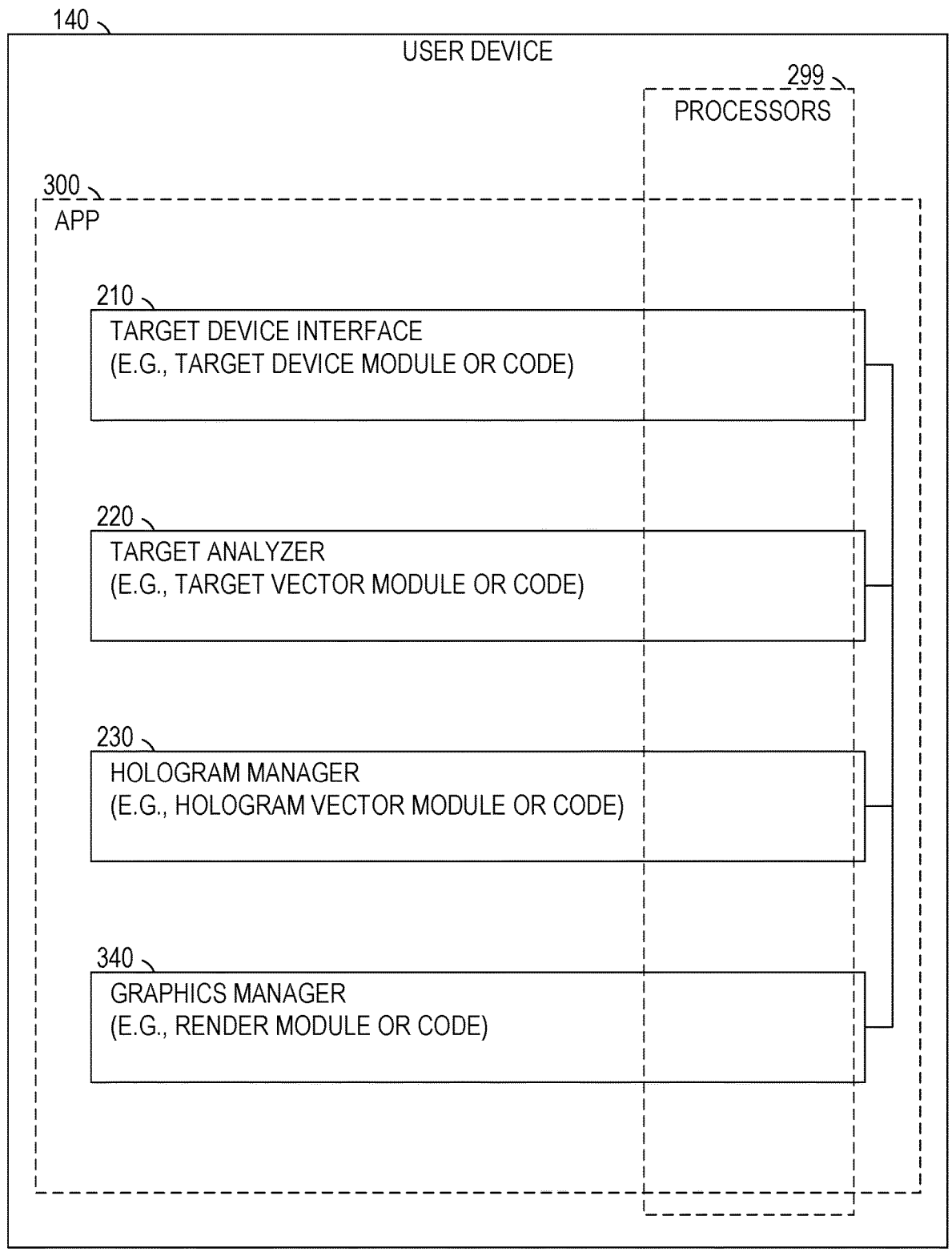
FIG. 3 is a block diagram illustrating components of a user device suitable for hologram location, according to some example embodiments.

FIG. 3 is a block diagram illustrating components of the user device 140, according to some example embodiments. The user device 150 may be similarly configured. In FIG. 3, the user device 140 is shown as including instances of the target device interface 210, the target analyzer 220, the hologram manager 230, and a graphics manager 340, all configured to communicate with each other (e.g., via a bus, shared memory, or a switch). Accordingly, in certain example embodiments, the user device 140 is configured to perform one or more the methodologies described herein. In some hybrid example embodiments, one or more of the methodologies described herein is performed by a combination of the hologram placement machine 110 and the user device 140.

As shown in FIG. 3, the target device interface 210, the target analyzer 220, the hologram manager 230, the graphics manager 340, or any suitable combination thereof, may form all or part of an app 300 (e.g., a mobile app) that is stored (e.g., installed) on the user device 140 (e.g., responsive to or otherwise as a result of data being received from the database 115). Furthermore, one or more processors 299 (e.g., hardware processors, digital processors, or any suitable combination thereof) may be included (e.g., temporarily or permanently) in the application 200, the target device interface 210, the target analyzer 220, the hologram manager 230, the graphics manager 340, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
FIG. 4 is a conceptual diagram illustrating a real-world scene that includes a target user and a target device that is obscured by clothing worn by the target user, according to some example embodiments.

FIG. 4 is a conceptual diagram illustrating a real-world scene 400 that includes the target user 132 and the target device 130, according to some example embodiments. The real-world scene 400 is real and observable by cameras and human eyes directed at the real-world scene 400, in contrast with an augmented reality scene or a virtual reality scene, either of which would include at least one machine-rendered (e.g., computer-generated) object that does not exist in the real-world scene 400.

In the real-world scene 400 shown in FIG. 4, the target device 130 is present but obscured by clothing worn by the target user 132. For example, the target device 130 may be traveling with the target user 132 (e.g., at any zero or nonzero speed, in any direction in three-dimensional space)

by virtue of being placed in a coat pocket of the target user 132. Accordingly, with respect to a fixed frame of reference (e.g., the surface of the planet Earth or any sub-region thereof), the target device 130 may be moving in the same direction as the target user 132 and moving with the same speed as the target user 132 in that direction. This movement may be detected by the target device 130 (e.g., via one or more geolocation sensors) and represented (e.g., encoded) as motion data (e.g., target motion data) that describes geolocation movement of the target device 130.

Figure 5:
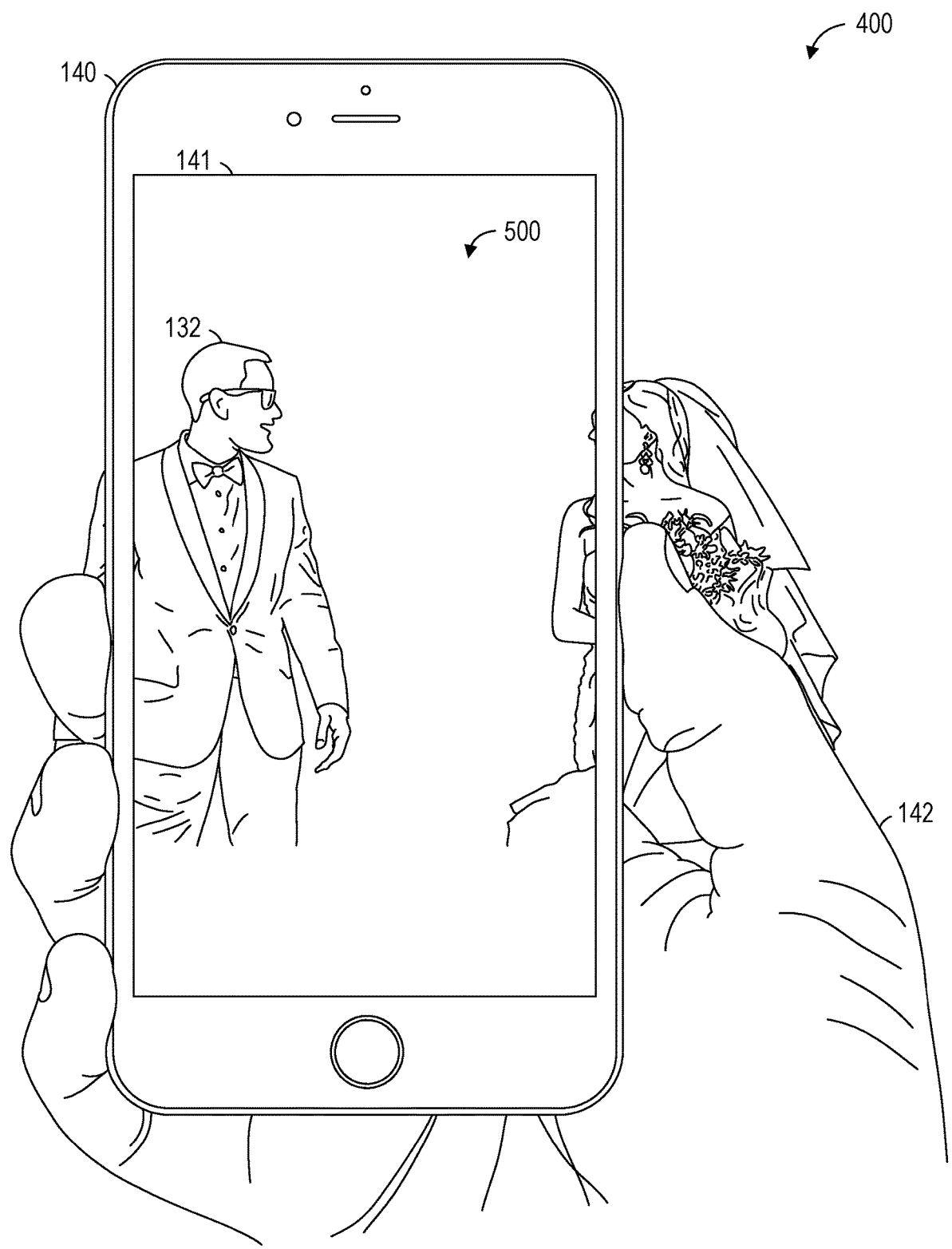
FIG. 5 is a conceptual diagram illustrating a user device displaying an augmented reality scene that includes the target user, according to some example embodiments.

FIG. 5 is a conceptual diagram illustrating the user device 140 (e.g., viewing device) displaying an augmented reality scene 500 that includes the target user 132, according to some example embodiments. A display screen 141 of the user device 140 presents (e.g., displays) the augmented reality scene 500, which is a composited blend of real-world visual data (e.g., live video or a still image of the real-world scene 400, as captured by a camera of the user device 140) and one or more machine-rendered three-dimensional objects. As shown in FIG. 5, the augmented reality scene 500 is generated by adding one or more machine-rendered three-dimensional objects to live video captured by a camera of the user device 140 (e.g., within a field of view of the camera of the user device 140). In the example scenario shown FIG. 5, the target user 132 is largely within the field of view of the camera, and the augmented reality scene 500 accordingly includes a large portion of the target user 132. In an alternative example scenario, the target user 132 is not within the field of view of the camera, and the augmented reality scene 500 would accordingly omit the target user 132.

Figure 6:
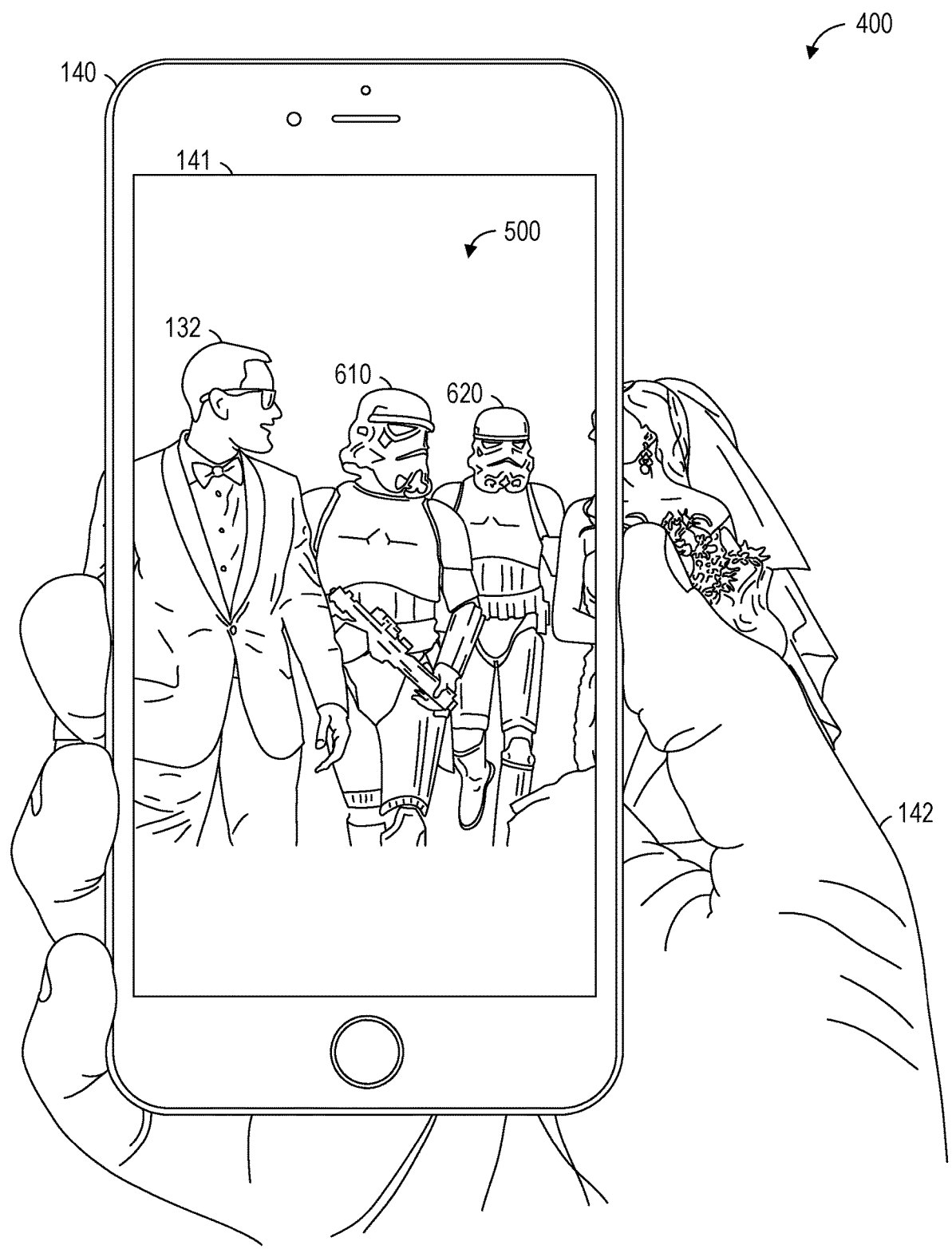
FIG. 6 is a conceptual diagram illustrating the user device displaying the augmented reality scene that includes a target user, as well as multiple holograms located relative to the target device of the target user, according to some example embodiments.

FIG. 6 is a conceptual diagram illustrating the user device 140 displaying the augmented reality scene 500 that includes the target user 132, as well as multiple holograms 610 and 620 located (e.g., placed) relative to the target device 130 of the target user 132, according to some example embodiments. As noted above, the display screen 141 presents the augmented reality scene 500. As shown in FIG. 6, the augmented reality scene 500 has composited the holograms 610 and 620 into the live video that is captured by the camera of the user device 140. As will be discussed in detail below, the holograms 610 and 620 have been placed and oriented based on the geolocation movement of the target device 130 (e.g., based on the direction and speed of the target device 130, as the target device 130 travels with the target user 132).

In the example scenario shown in FIG. 6, the hologram 610 has been placed at an offset distance behind and to the left of the target user 132 (e.g., based on the geolocation of the target device 130), and the hologram 610 is rendered to appear as if traveling in the same direction as the target user 132 but with a slightly different speed as the target user 132. Similarly, the hologram 620 has been placed at a different offset distance further behind and further to the left of the target user 132, and the hologram 620 is rendered to appear as if traveling in a slightly different direction and with a slightly different speed as the target user 132 (e.g., a speed that is similar to the speed at which the hologram 610 is apparently traveling).

Figure 7:
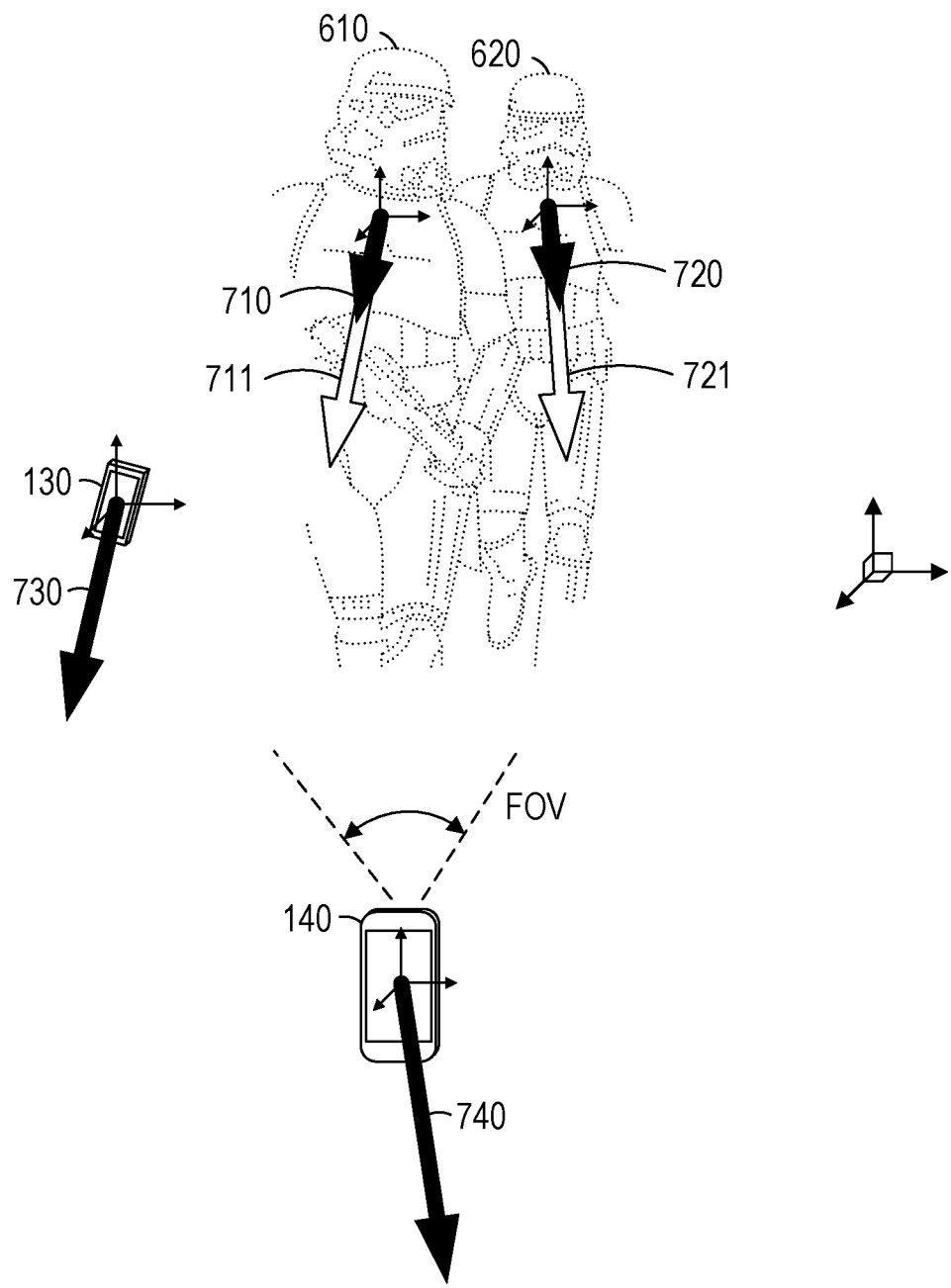
FIG. 7 is a conceptual diagram illustrating geolocations and motion vectors corresponding to the holograms, the target device, and the user device, according to some example embodiments.

FIG. 7 is a conceptual diagram illustrating geolocations and motion vectors corresponding to the holograms 610 and 620, the target device 130, and the user device 140, according to some example embodiments. The geolocations of the holograms 610 and 620, the target device 130, and the user device 140 may each respectively be specified by geolocation data, such as respective sets of GPS coordinates.

It may be helpful to next consider the target device 130. As noted above, the target device 130 can be moving (e.g., traveling) within the real-world scene 400 (e.g., by virtue of being placed in a coat pocket of the target user 132), and this movement can be detected by the target device 130 and represented as target motion data. Furthermore, the target motion data may be used (e.g., by the hologram placement machine 110 or the user device 140) to determine (e.g., by generation, calculation, or translation) a target motion vector 730 that indicates a target speed (e.g., 0.5 meters per second) of the target device 130 and also indicates a target direction (e.g., 45 degrees North-East, at 3 degrees upward inclination) in which the target device 130 is moving at the target speed. According to some example embodiments, the target motion vector 730 is determined (e.g., by the hologram placement machine 110 or the user device 140) with respect to a fixed frame of reference (e.g., the real-world scene 400, which may be or include the surface of the planet Earth or any sub-region thereof). In alternative example embodiments, the target motion vector 730 is determined with respect to the user device 140, which may itself be in motion with respect to the fixed frame of reference.

In example embodiments in which the user device 140 is moving within the real-world scene 400 (e.g., by virtue of being carried in a hand of the user 142 as the user 142 is walking in the real-world scene 400). This movement can be detected by the user device 140 (e.g., provided one or more geolocation sensors) and represented as user motion data. Furthermore, the user motion data may be used (e.g., by the hologram placement machine 110 or the user device 140) to determine a user motion vector 740 that indicates a user speed (e.g., 0.6 meters per second) of the user device 140 and also indicates a user direction (e.g., 22.5 degrees North Northeast, at 5 degrees upward inclination) at which the user device 140 is moving at the user speed of the user device 140. As shown in FIG. 7, whether the target device 130 is within the field of view of the camera of the user device 140 depends on the relative movement between the target device 130 and the user device 140, as well as on the orientation of the user device 140 (e.g., in aiming its camera).

According to the methodologies discussed herein, hologram motion vectors 710 and 720 can be respectively determined (e.g., by the hologram placement machine 110 or the user device 140) for the holograms 610 and 620, and such determinations may be based on the target motion vector 730 of the target device 130. In the example embodiments illustrated in FIG. 7, the hologram motion vector 710 is a relative motion vector that indicates a relative speed of the hologram 610 with respect to the target motion vector 730 of the target device 130 and also indicates a relative direction in which the hologram 610 moves with respect to the target motion vector 730. For example, the hologram motion vector 710 may indicate that the hologram 610 is moving in the same direction as the target device 130 but with a different speed compared to the target device 130. Likewise, the hologram motion vector 720 is a relative motion vector that indicates a relative speed of the hologram 620 with respect to the target motion vector 730 of the target device 130 and also indicates a relative direction in which the hologram 620 moves with respect to the target motion vector 730. For example, the hologram motion vector 720 may indicate that the hologram 620 is traveling in a different direction than the target device 130 but with a speed similar to the speed at which the hologram 610 is traveling relative to the target device 130.

FIG. 7 additionally illustrates hologram motion vectors 711 and 721 that respectively correspond to the holograms 610 and 620. In example embodiments in which the hologram motion vector 710 is a relative motion vector that indicates the relative speed and the relative direction of the hologram 610 with reference to the target motion vector 730 of the target device 130, the hologram motion vector 711 may be an absolute motion vector that is or includes a vector sum of the target motion vector 730 and the hologram motion vector 710 of the hologram 610. Thus, the hologram motion vector 711 may describe the actual speed (e.g., hologram speed) and actual direction (e.g., hologram direction) of the hologram 610 with respect to the same frame of reference (e.g., the surface of the planet Earth or any sub-region thereof) in which the target motion vector 730 describes the motion of the target device 130.

Similarly, the hologram motion vector 721 may be an absolute motion vector that is or includes a vector sum of the target motion vector 730 and the hologram motion vector 720 of the hologram 620. Thus, the hologram motion vector 721 may describe the actual speed and actual direction of the hologram 620 with respect to the same frame of reference (e.g., the surface of the planet Earth or any sub-region thereof) in which the target motion vector 730 describes the motion of the target device 130.

As shown in FIG. 7, the geolocation of the target device 130 is represented by a set of axes that forms the origin of the target motion vector 730. The geolocation of the user device 140 is represented by another set of axes that forms the origin of the user motion vector 740. The real-world scene 400 and the augmented reality scene 500 may share a common frame of reference (e.g., relative to the surface of the planet Earth or a sub-region thereof). Accordingly, a virtual geolocation of the hologram 610 in the augmented reality scene 500 may coincide with a physical geolocation in the real-world scene 400. In FIG. 7, the geolocation of the hologram 610 is represented by a set of axes that coincides with the origin of the hologram motion vector 710. Similarly, the geolocation of the hologram 620 is represented by another set of axes that coincides with the origin of the hologram motion vector 720.

Figure 8:
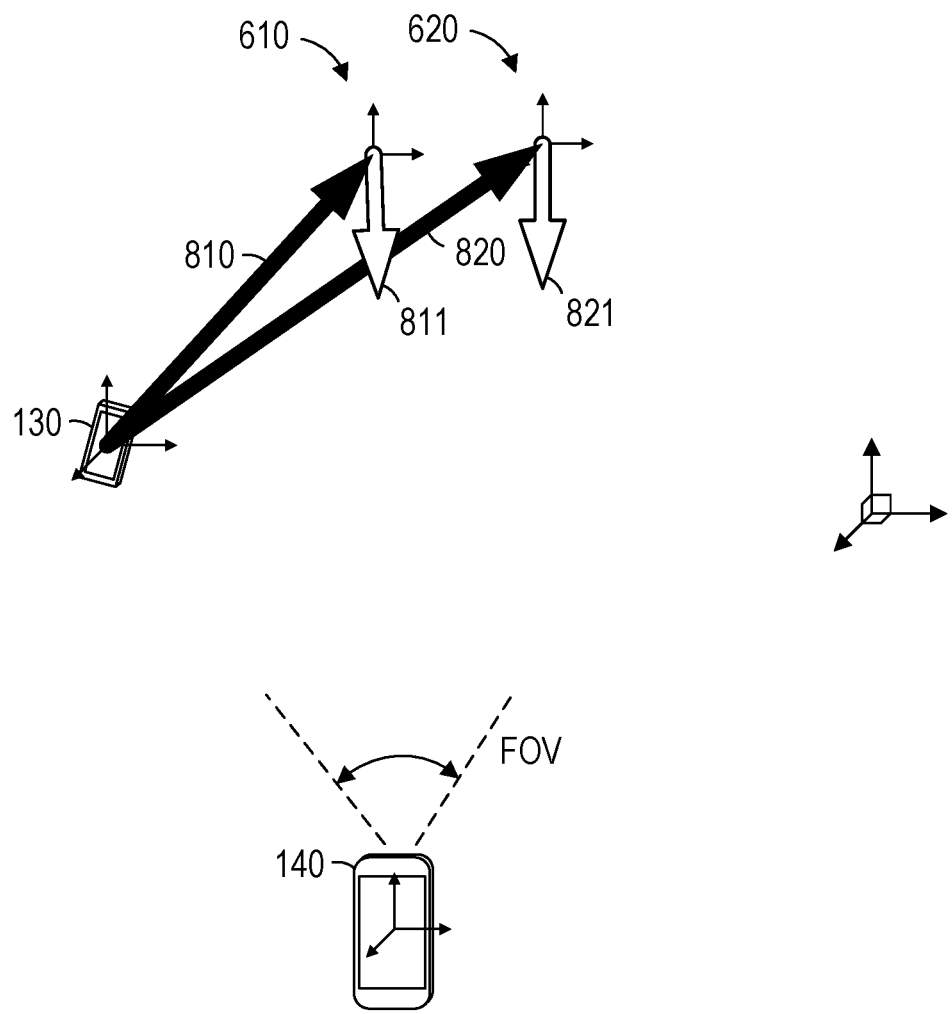
FIG. 8 is a conceptual diagram illustrating geolocations, offset vectors, an orientation vectors corresponding to the holograms, according to some example embodiments.

FIG. 8 is a conceptual diagram illustrating geolocations, offset vectors, and orientation vectors corresponding to the holograms 610 and 620, according to some example embodiments, as well as geolocations of the target device 130 and the user device 140. As shown, the geolocation of the hologram 610 can be specified with respect to the geolocation of the target device 130 by an offset vector 810 (e.g., indicating one or more relative differences in GPS coordinates). The offset vector 810 is a relative offset vector that indicates a hologram offset distance between the target device 130 and the hologram 610 in the augmented reality scene 500 and also indicates a hologram offset direction of the hologram 610 with respect to the target device 130 within the augmented reality scene 500. In some example embodiments, the offset vector 810 is a relative offset vector with respect to the target device 130, while in alternative example embodiments, the offset vector 810 is a relative offset vector with respect to the user device 140.

Similarly, the geolocation of the hologram 620 can be specified with respect to the geolocation of the target device 130 by another offset vector 820 (e.g., indicating one or more relative differences in GPS coordinates). The offset vector 820 is a relative offset vector that indicates a hologram offset distance between the target device 130 and the hologram 620 in the augmented reality scene 500 and also indicates a hologram offset direction of the hologram 620 with respect to the target device 130 within the augmented reality scene 500. In some example embodiments, the offset vector 820 is a relative offset vector with respect to the target device 130, while in alternative example embodiments, the offset vector 820 is a relative offset vector with respect to the user device 140. As shown in FIG. 8, whether one or both of the holograms 610 and 620 are within the field of view of the camera of the user device 140 depends on the relative movement between each of the holograms 610 and 620 and the user device 140, as well as on the orientation of the user device 140 (e.g., in aiming its camera).

In addition, as shown in FIG. 8, an orientation vector 811 of the hologram 610 indicates a direction in which the hologram 610 is oriented (e.g., facing or pointing). The orientation vector 811 may be a relative orientation vector that indicates a relative orientation direction of the hologram 610 with respect to the target device 130, the target motion vector 730 of the target device 130, or both. Likewise, an orientation vector 821 of the hologram 620 indicates a direction in which the hologram 620 is oriented, and the orientation vector 821 may be a relative orientation vector that indicates a relative orientation direction of the hologram 620 with respect to the target device 130, the target motion vector 730 of the target device 130, or both. In alternative example embodiments, one or both of the orientation vectors 811 and 821 indicate relative orientation directions with respect to the user device 140, the user motion vector 740, or both.

Figure 9:
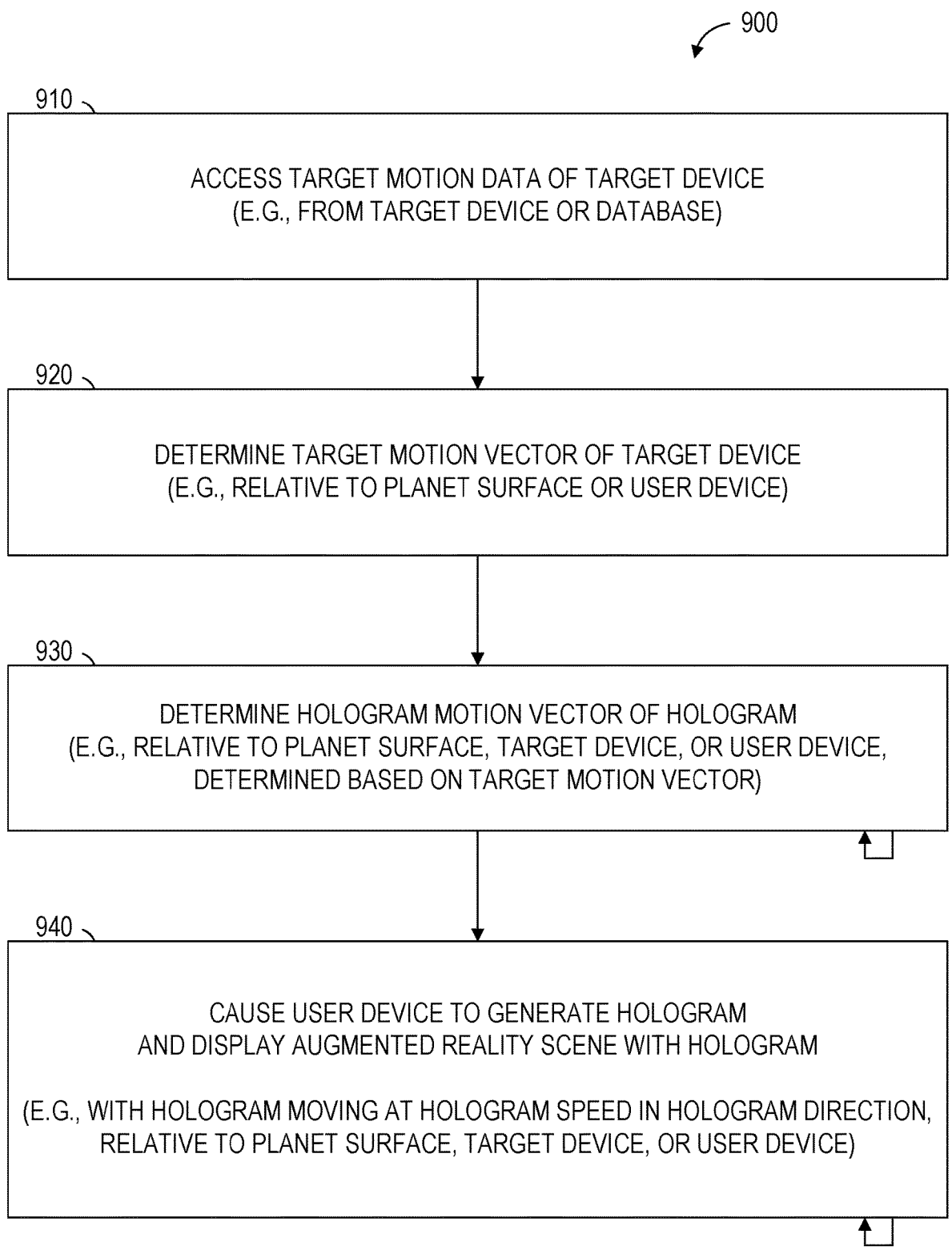
FIGS. 9-13 are flowcharts illustrating operations a method of hologram location, according to some example embodiments.

FIGS. 9-13 are flowcharts illustrating operations a method 900 of hologram location, according to some example embodiments. Operations in the method 900 may be performed by the hologram placement machine 110, the user device 140, or a combination of both, using components (e.g., modules) described above with respect to FIG. 2 and FIG. 3, using one or more processors 299 (e.g., microprocessors or other hardware processors), or using any suitable combination thereof. However, for clarity of description with respect to FIGS. 9-13, the method 900 is generally described as if being performed by the user device 140, unless otherwise specified. As shown in FIG. 9, the method 900 includes operations 910, 920, 930, and 940.

In operation 910, the target device interface 210 accesses target motion data that describes geolocation movement of the target device 130 (e.g., as it moves from one geolocation to another geolocation, over a period of time). The target motion data may be generated by one or more sensors in the target device 130 (e.g., a GPS receiver). In some example embodiments, the target motion data is accessed directly from the target device 130 (e.g., via the network 190 or via direct peer-to-peer networking). In other example embodiments, the target motion data is uploaded by the target device 130 to the database 115 and accessed therefrom.

In operation 920, the target analyzer 220 determines (e.g., generates, calculates, translates, or otherwise obtains) the target motion vector 730 that corresponds to the target device 130. The determination of the target motion vector 730 is performed based on the target motion data accessed in operation 910. For example, the target motion data may indicate that the target device 130 moved from a first geolocation to a second geolocation over a measured period of time, and the target motion vector 730 may be determined from the first and second geolocations and the measured period of time. As noted above, the target motion vector 730 indicates a target speed at which the target device 130 is moving within the real-world scene 400 (e.g., with respect to the surface of the planet Earth or any sub-region thereof) and also indicates a target direction in which the target device 130 is moving at the target speed within the real-world scene 400 (e.g., also with respect to the surface of the planet Earth or the same sub-region thereof).

In operation 930, the hologram manager 230 determines (e.g., generates, calculates, translates, or otherwise obtains) the hologram motion vector 710 that corresponds to the hologram 610 (e.g., to be generated within the augmented reality scene 500 to be presented by the user device 140). The determination of the hologram motion vector 710 may be performed based on the target motion vector 730 that was determined in operation 920, and the hologram vector 710 may accordingly be relative to the target motion vector 730.

Since the target motion vector 730 indicates the direction and speed of the target device 130 within the real-world scene 400, the hologram motion vector 710 may be considered as a relative motion vector that indicates a relative speed (e.g., a relative real-world speed, even though the hologram 610 will be generated in the augmented reality scene 500) of the hologram 610 with respect to the target device 130 itself and indicates a relative direction (e.g., a relative real-world direction, even though the hologram 610 will be generated in the augmented reality scene 500) in which the hologram 610 moves with respect to the target device 130 itself. In some example embodiments, performance of operation 930 includes accessing the relative speed of the hologram 610 from a hologram database (e.g., database 115) that correlates the relative speed with the hologram 610, accessing the relative direction of the hologram 610 from the hologram database, or both. Analogous operations may be performed similarly for one or more additional holograms (e.g., hologram 620) to be generated in the augmented reality scene 500.

In operation 940, the graphics manager 340 of the user device 140 causes the user device 140 to generate the hologram 610 and display the augmented reality scene 500 that includes the hologram 610 and in which the hologram 610 moves. The motion of the hologram 610 within the augmented reality scene 500 may be based on (e.g., in accordance with) the hologram motion vector 710 determined in operation 930. Furthermore, in example embodiments in which the hologram motion vector 710 is a relative motion vector with respect to the target motion vector 730, the motion of the hologram 610 within the augmented reality scene 500 may also be based on (e.g., in accordance with) the hologram motion vector 711 (e.g., as described above with respect to FIG. 7).

Accordingly, the graphics manager 340 causes the hologram 610 to move at a hologram speed that is determined (e.g., by the graphics manager 340) based on the target speed of the target device 130 and on the relative speed of the hologram 610 with respect to the target device 130. Moreover, the graphics manager 340 causes the hologram 610 to move in a hologram direction that is determined (e.g., by the graphics manager 340) based on the target direction of the target device 130 and on the relative direction of the hologram 610 with respect to the target device 130. Analogous operations would be performed similarly for one or more additional holograms (e.g., hologram 620) in the augmented reality scene 500.

In example embodiments in which the method 900 is performed by the hologram placement machine 110, operation 940 is performed by the user device interface 240. In general, operations described as being performed by the graphics manager 340 of the user device 140 may be performed by the user device interface 240 of the hologram placement machine 110 itself or caused by the user device interface 240 to be performed elsewhere (e.g., by the graphics manager 340 of the user device 140). For example, the user device interface 240 may cause the user device 140 (e.g., via the graphics manager 340) to perform the generation of the hologram 610 and the display of the augmented reality scene 500 that includes the hologram 610 and in which the hologram 610 moves.

Figure 10:
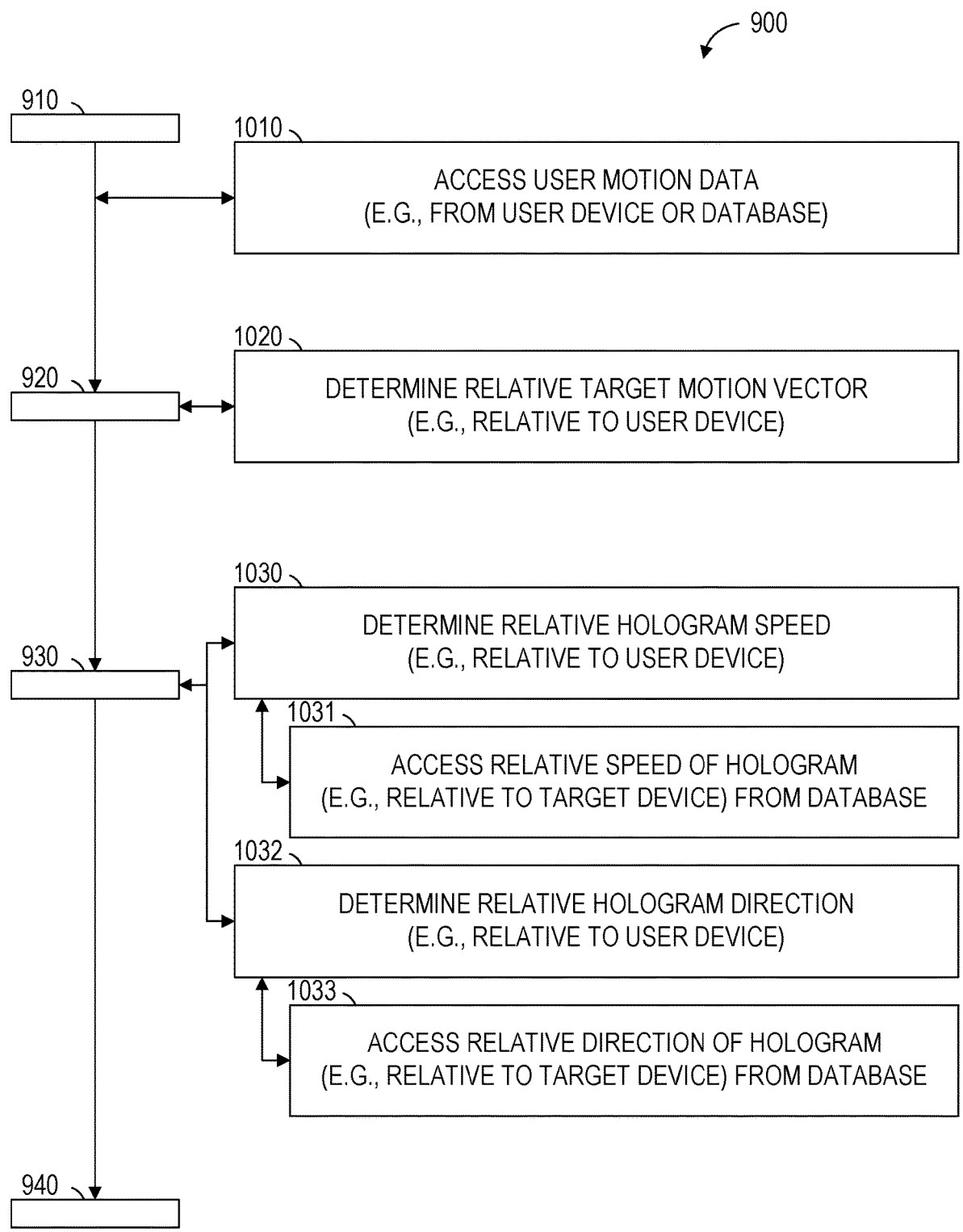

As shown in FIG. 10, in addition to any one or more of the operations previously described, the method 900 may include one or more of operations 1010, 1020, 1030, 1031, 1032, and 1033, according to various example embodiments. Operation 1010 may be performed at any point prior to operation 920, in which the target analyzer 220 determines the target motion vector 730 of the target device 130. In operation 1010, the target analyzer 220 accesses user motion data that describes geolocation movement of the user device 140 (e.g., as it moves from one geolocation to another geolocation, over a period of time, relative to a fixed frame of reference, such as the surface of the planet Earth or any sub-region thereof).

According to certain example embodiments, the user motion data is accessed from the user device 140, the database 115, or both. Moreover, the accessing of the user motion data for the user device 140 may be based on (e.g., in response to) an indication that the user device 140 will display the augmented reality scene 500. Such an indication may be received (e.g., by the app 300 or the application 200) as a result of user input (e.g., by the user 142) at the user device 140, a result of user input (e.g., by the user 132) at the target device 130, a result of the target device 130 being detected within the field of view of a camera of the user device 140, or any suitable combination thereof.

Operation 1020 may be performed as part (e.g., a precursor task, a subroutine, or a portion) of operation 920, in which the target analyzer 220 determines the target motion vector 730. In operation 1020, the target analyzer 220 determines the target motion vector 730 as a relative motion vector, and the relative motion vector may describe the motion of the target device 130 with respect to the user device 140, which itself may be in motion with respect to the real-world scene 400. Since the hologram speed of the hologram 610 may be determined based on the target motion vector 730, the hologram speed of the hologram 610 may be determined with respect to the user device 140. Similarly, since the hologram direction of the hologram 610 may be determined based on the target motion vector 730, the hologram direction of the hologram 610 may also be determined with respect to the user device 140.

One or both of operations 1030 and 1032 may be performed as part of operation 930, in which the hologram manager 230 determines the hologram motion vector 710 of the hologram 610. As noted above, the hologram motion vector 710 may be a relative motion vector that describes the motion of the hologram 610 with respect to the user device 140 that will generate the hologram 610 and present the augmented reality scene 500.

In operation 1030, the hologram manager 230 determines the relative hologram speed of the hologram 610 relative to the user device 140. This determination may be based on the target speed of the target device 130 (e.g., with respect to the surface of the planet Earth or a sub-region thereof) and on the relative speed of the hologram 610 (e.g., with respect to the target device 130).

Operation 1031 may be performed as part of operation 1030. In operation 1031, the hologram manager 230 accesses the relative speed of the hologram 610 (e.g., with respect to the target device 130), and the relative speed of the hologram 610 may be accessed from the database 115 or another data source accessible via the network 190. That is, the database 115 may store the relative speed of the hologram 610 with respect to any target device (e.g., target device 130), and this relative speed may be accessed in operation 1031.

In operation 1032, the hologram manager 230 determines the relative hologram direction of the hologram 610 relative to the user device 140. This determination may be based on the target direction of the target device 130 (e.g., with respect to the surface of the planet Earth or the sub-region thereof used in operation 1030) and on the relative direction of the hologram 610 (e.g., with respect to the target device 130).

Operation 1033 may be performed as part of operation 1032. In operation 1032, the hologram manager 230 accesses the relative direction of the hologram 610 (e.g., with respect to the target device 130), and the relative direction of the hologram 610 may be accessed from the database 115 or another data source accessible via the network 190. That is, the database 115 may store the relative direction of the hologram 610 with respect to any target device (e.g., target device 130), and this relative direction may be accessed in operation 1033.

Figure 11:
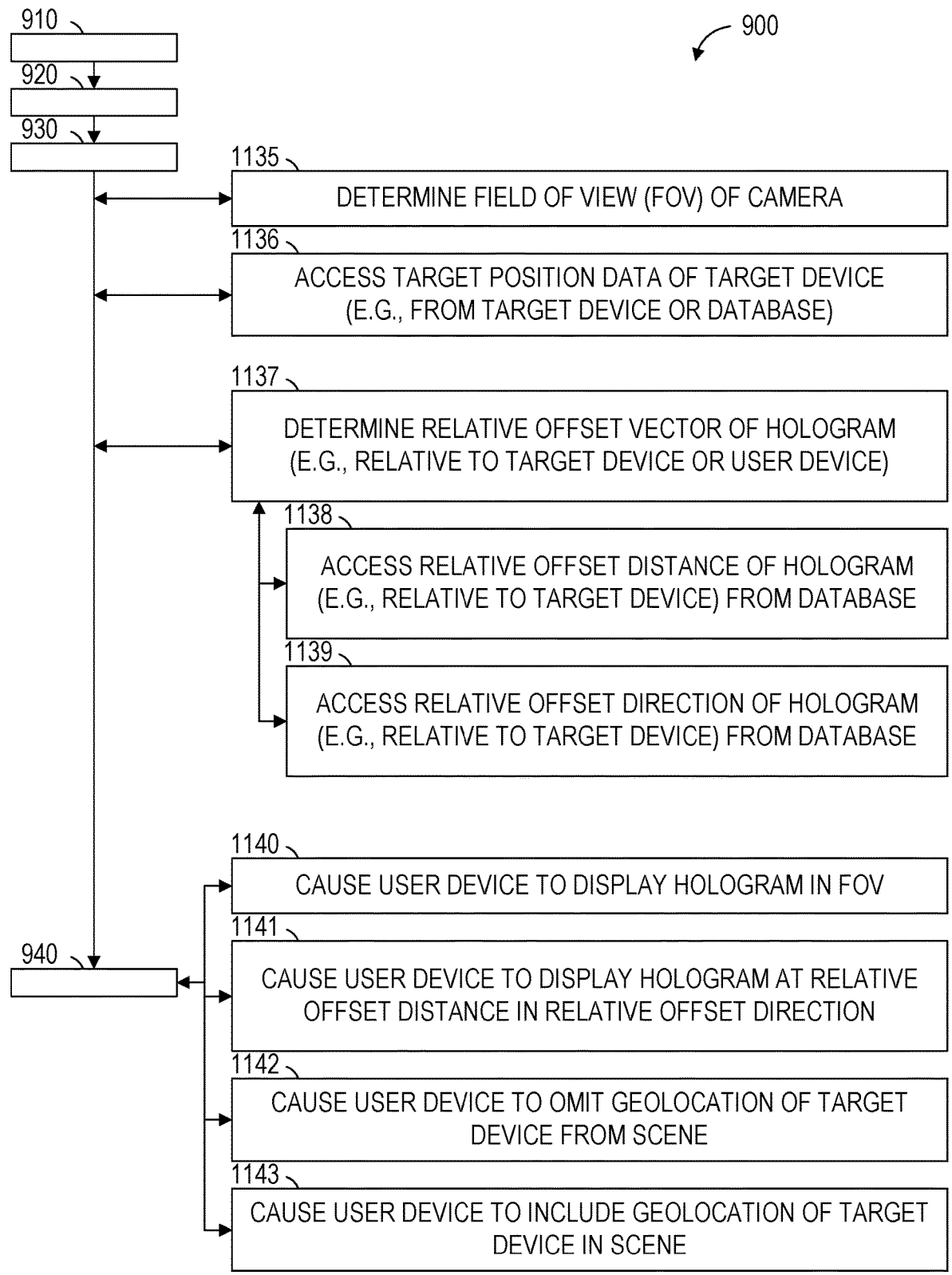

As shown in FIG. 11, in addition to any one or more of the operations previously described, the method 900 may include one or more of operations 1135, 1136, 1137, 1138, 1139, 1140, 1141, 1142, and 1143, according to various example embodiments. Operation 1135 may be performed at any point prior to operation 940, in which the graphics manager 340 causes the user device 140 to generate the hologram 610 (e.g., along with one or more additional holograms, such as the hologram 620) and display the augmented reality scene 500. In operation 1135, the graphics manager 340 determines the field of view of a camera in the user device 140 (e.g., a camera that is being managed by the app 300). According to some example embodiments, this determination includes accessing (e.g., via a lookup) metadata that is stored by the user device 140 and describes the field of view of the camera. According to alternative example embodiments, this determination includes obtaining such metadata via the network 190 (e.g., from the database 115).

With or without operation 1135, operation 1136 may be performed at any point prior to operation 940. In operation 1136, the target device interface 210 accesses target position data of the target device 130. The target position data describes a geolocation of the target device 130 and may be accessed in a manner similar to that described above with respect to the accessing of the target motion data of the target device 130 in operation 910. The target position data of the target device 130 may be generated by one or more sensors (e.g., a GPS receiver) in the target device 130. In some example embodiments, the target position data is accessed directly from the target device 130 (e.g., via the network 190 or via direct peer-to-peer networking). In other example embodiments, the target position data is uploaded by the target device 130 to the database 115 and accessed therefrom.

In example embodiments that include operation 1135, operation 1140 may be performed as part of operation 940. In operation 1140, the graphics manager 340 causes the user device 140 to display the hologram 610 within the field of view determined in operation 1135. Furthermore, in some example embodiments where the target position data of the target device 130 was accessed in operation 1136, operation 1140 may include detecting that the geolocation of the target device 130 is within the field of view of the camera of the user device 140. Based on this detection, the graphics manager 340 may perform operation 1143 (e.g., as part of operation 940) by causing the user device 140 to include (e.g., encompass) the geolocation of the target device 130 in the augmented reality scene 500.

Alternatively, in certain example embodiments where the target position data of the target device 130 was accessed in operation 1136, operation 1140 may include detecting that the geolocation of the target device 130 is outside the field of view of the camera of the user device 140. Based on this detection, the graphics manager 340 may perform operation 1142 (e.g., as part of operation 940) for causing the user device 140 to exclude (e.g., omit) the geolocation of the target device 130 from the augmented reality scene 500.

In example embodiments that include operation 1136, operation 1137 may be performed at any point prior to operation 940, in which the graphics manager 340 causes the user device 140 to generate the hologram 610 (e.g., along with one or more additional holograms, such as the hologram 620) and display the augmented reality scene 500. In operation 1137, the hologram manager 230 determines (e.g., accesses, calculates, or otherwise obtains) the offset vector 810 of the hologram 610, which may be a relative offset vector that indicates a relative offset distance for the hologram 610 and indicates a relative offset direction for the hologram 610. The determination of the offset vector 810 may include accessing (e.g., via a lookup) the relative offset distance, the relative offset direction, or both, from the database 115. In some example embodiments, the determination of the offset vector 810 is performed dynamically by execution of software (e.g., accessed from the database 115) that specifies or otherwise describes one or more translational movements of the hologram 610.

As shown in FIG. 11, operation 1137 may include one or both of operations 1138 and 1139. In operation 1138, the hologram manager 230 determines (e.g., accesses or calculates) the relative offset distance of the hologram 610 (e.g., with respect to the target device 130). For example, the relative offset distance may be accessed from the database 115. As another example, the relative offset distance may be dynamically calculated by execution of motion-generating or otherwise motion-specifying software (e.g., stored by the database 115 and accessed therefrom for execution). Similarly, in operation 1139, the hologram manager 230 determines the relative offset direction of the hologram 610 (e.g., with respect to the target device 130). For example, the relative offset direction may be accessed from the database 115. As another example, the relative offset direction may be dynamically calculated by execution of motion-generating or otherwise motion-specifying software (e.g., stored by the database 115 and accessed therefrom for execution).

In example embodiments that include operation 1137, operation 1141 may be performed as part of operation 940, in which the graphics manager 340 causes the user device 140 to generate the hologram 610 and display the augmented reality scene 500. In operation 1141, the graphics manager 340 causes the user device 140 to display the hologram 610 in accordance with the offset vector 810 of the hologram 610. For example, the graphics manager 340 may cause the hologram 610 to appear in the augmented reality scene 500 at the relative offset distance indicated by the offset vector 810 and in the relative offset direction indicated by the offset vector 810. As noted above, according to various example embodiments, the relative offset distance may have been determined in operation 1138, and the relative offset direction may have been determined in operation 1139.

Figure 12:
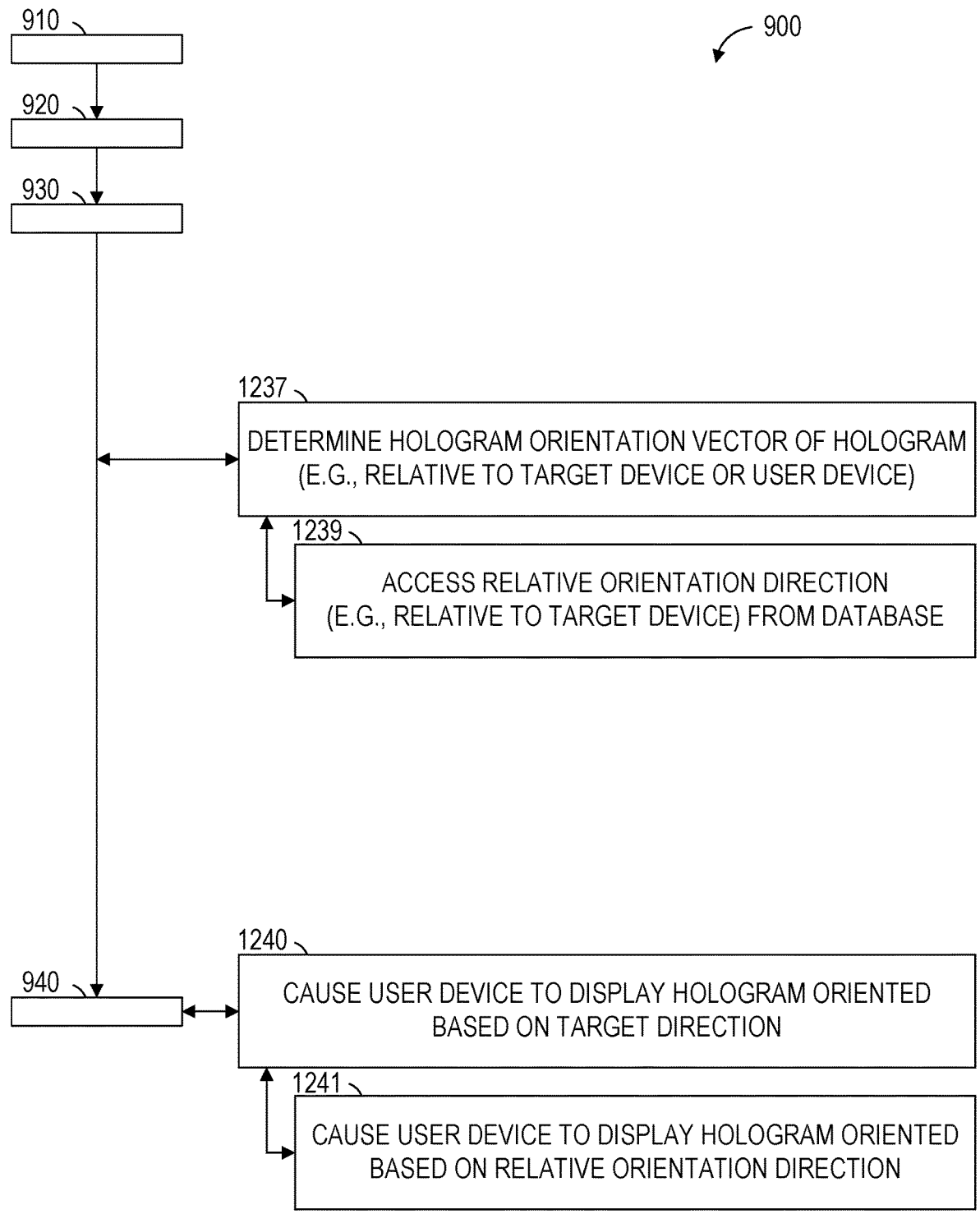

As shown in FIG. 12, in addition to any one or more of the operations previously described, the method 900 may include one or more of operations 1237, 1239, 1240, and 1241. Operation 1237 may be performed at any point prior to operation 940, in which the graphics manager 340 causes the user device 140 to generate the hologram 610 (e.g., along with one or more additional holograms, such as the hologram 620) and display the augmented reality scene 500. In operation 1237, the hologram manager 230 determines (e.g., accesses, calculates, or otherwise obtains) the orientation vector 811 of the hologram 610, which may be a relative orientation vector that indicates a relative orientation direction in which the hologram 610 is oriented (e.g., relative to the target device 130, the target motion vector 730, or both). The determination of the orientation vector 811 may include accessing (e.g., via a lookup) the relative orientation direction from the database 115. In some example embodiments, the determination of the relative orientation direction is performed dynamically by execution of software (e.g., accessed from the database 115) that specifies or otherwise describes one or more rotational movements of the hologram 610.

As shown in FIG. 12, operation 1237 may include operation 1239. In operation 1239, the hologram manager 230 determines (e.g., accesses or calculates) the relative orientation direction of the hologram 610 (e.g., with respect to the target motion vector 730). For example, the relative orientation direction may be accessed from the database 115. As another example, the relative orientation direction may be dynamically calculated by execution of rotation-generating or otherwise rotation-specifying software (e.g., stored by the database 115 and accessed therefrom for execution).

As shown in FIG. 12, operation 1240 may be performed as part of operation 940, in which the graphics manager 340 causes the user device 140 to generate the hologram 610 and display the augmented reality scene 500. In operation 1240, the graphics manager 340 causes the user device 140 to display the hologram 610 with an orientation that is determined based on the target motion vector 730 of the target device 130. In alternative example embodiments, the orientation is determined based on the user motion vector 740 of the user device 140, and hybrid example embodiments may determine the orientation based on both the target motion vector 730 and the user motion vector 740.

Furthermore, operation 1241 may be performed as part of operation 1240. In operation 1241, the graphics manager 340 causes the user device 140 to display the hologram 610 with an orientation that is determined based on the relative orientation direction (e.g., relative to the target device 130 or the target motion vector 730) determined in operation 1237.

Figure 13:
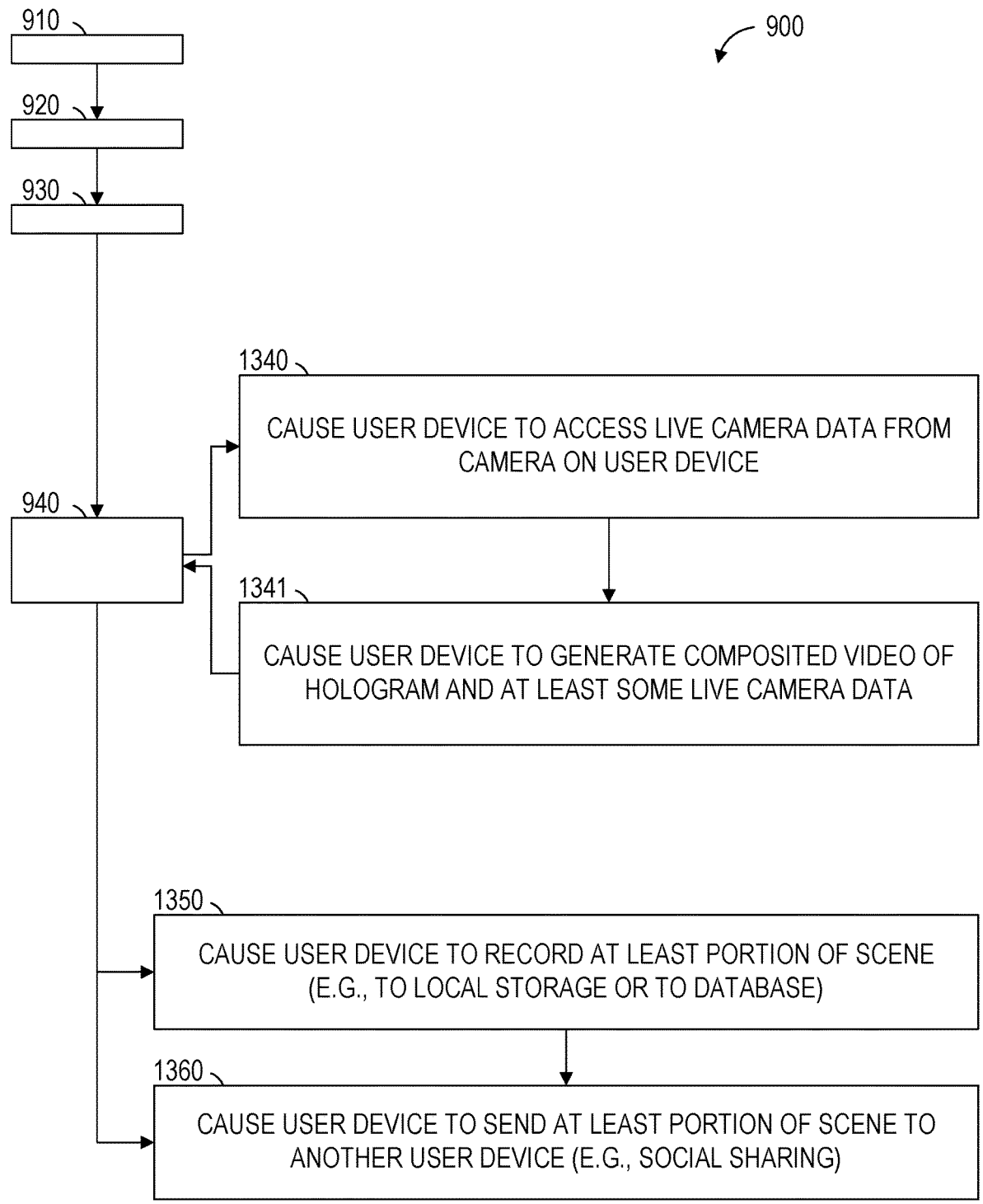

As shown in FIG. 13, in addition to any one or more of the operations previously described, the method 900 may include one or more of operations 1340, 1341, 1350, and 1360, according to various example embodiments. One or both of operations 1340 may be performed as part of operation 940. In operation 1340, the graphics manager 340 causes the user device 140 to access live camera data from a camera of the user device 140. This may be performed by retrieving one or more frames of video from a memory that corresponds to the camera, as the camera captures at least a portion of the real-world scene 400.

In operation 1341, the graphics manager 340 causes the user device 140 to fully or partially generate the augmented reality scene 500 by generating composited video that includes the hologram 610 and at least some of the live camera data accessed in operation 1340. This may have the effect of compositing the hologram 610 onto at least a portion of the live camera data to fully or partially generate the augmented reality scene 500.

One or both of operations 1350 and 1360 may be performed after operation 940, in which the graphics manager 340 causes the user device 140 to generate the hologram 610 (e.g., along with one or more additional holograms, such as the hologram 620) and display the augmented reality scene 500. In operation 1350, the graphics manager 340 causes the user device 140 to record at least a portion of the augmented reality scene 500. This may be performed in response to user input (e.g., by the user 142), based on one or more user preferences (e.g., set by the user 142 and stored by the user device 140 or the database 115), or any suitable combination thereof.

The portion of the augmented reality scene 500 may be recorded to local storage at the user device 140, uploaded to the database 115, or both. The recorded portion of the augmented reality scene 500 depicts the hologram 610 moving in accordance with the hologram motion vector 710 determined in operation 930 and may depict one or more additional holograms (e.g., hologram 620) moving in accordance with their respective hologram motion vectors (e.g., hologram motion vector 720 determined in additional instances of operation 930).

In operation 1360, the graphics manager 340 causes the user device 140 to communicate at least a portion of the displayed augmented reality scene 500 to another user device (e.g., user device 150). For example, the portion of the augmented reality scene 500 may be communicated from the user device 140 to the user device 150 via the network 190 or via direct peer-to-peer networking. In example embodiments that include operation 1350, the portion communicated is or includes the portion that was recorded in operation 1350. This may have the effect of enabling social sharing (e.g., by one or more social networks, such as social media sharing networks) of the augmented reality scene 500 or one or more portions thereof by the user 142 of the user device 140 with one or more friends, connections, followers, or other social networking contacts (e.g., user 152 of the user device 150).

According to various example embodiments, one or more of the methodologies described herein may facilitate static or dynamic location (e.g., placement) of one or more holograms within a generated augmented reality scene or within a generated virtual reality scene. Moreover, one or more of the methodologies described herein may facilitate determining the offset positions of one or more holograms, the speeds of movement of one or more holograms, the directions of movement of one or more holograms, the orientations of one or more holograms, or any suitable combination thereof, relative to a target device, for example, based on the speed of movement of the target device, the direction of movement of the target device, or both. Hence, one or more of the methodologies described herein may facilitate simple or complex, static or dynamic behavior of a hologram or a group of holograms, as well as generation, rendering, and display of augmented reality or virtual reality scenes that include such holograms, as compared to capabilities of pre-existing systems and methods.

When these effects are considered in aggregate, one or more of the methodologies described herein may obviate a need for certain efforts or resources that otherwise would be involved in hologram location. Efforts expended by a user (e.g., a hologram artist) in performing static or dynamic hologram location may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 14:
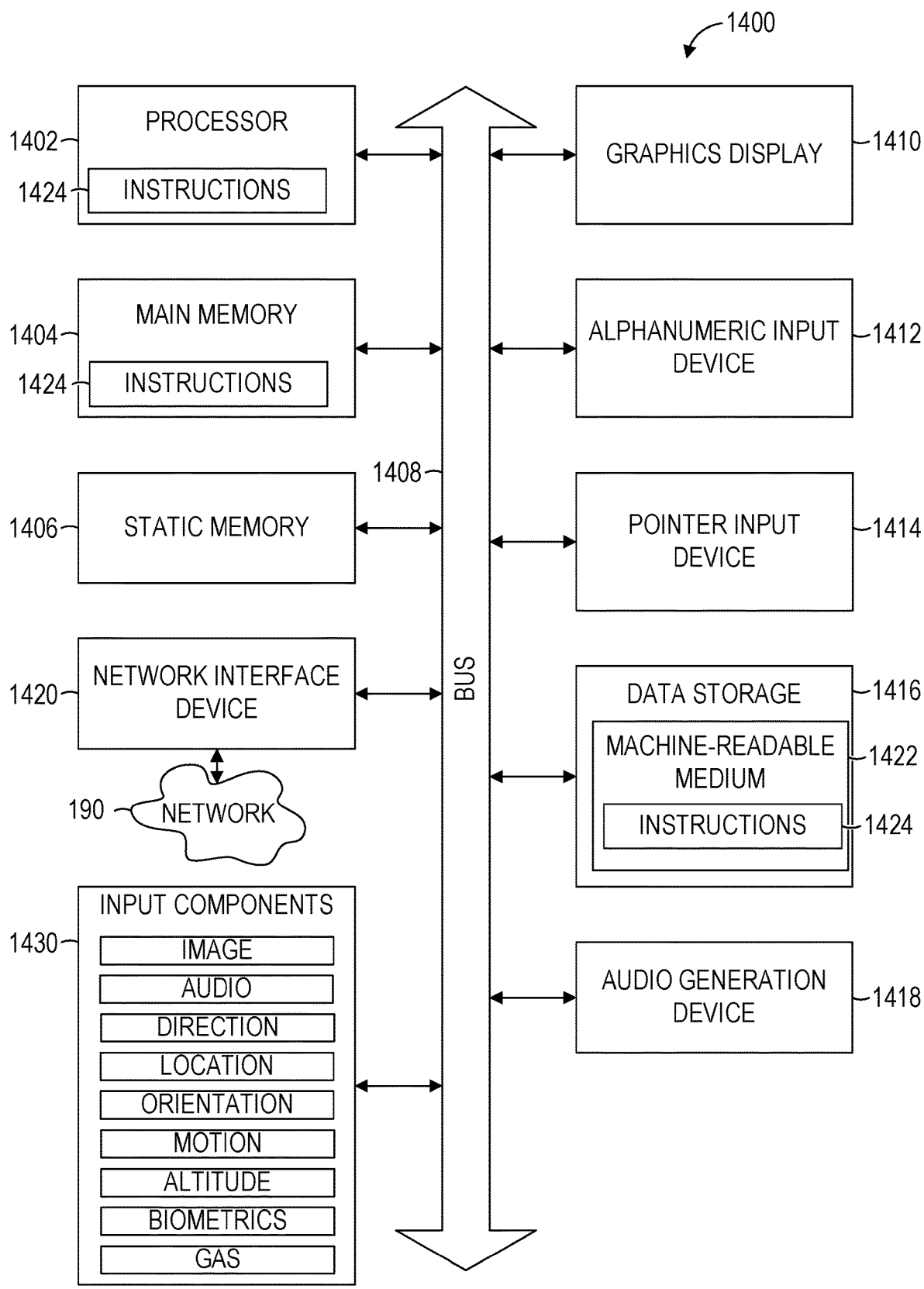
FIG. 14 is a block diagram illustrating components of a machine, according to some example embodiments, able to read instructions from a machine-readable medium and perform any one or more of the methodologies discussed herein.

FIG. 14 is a block diagram illustrating components of a machine 1400, according to some example embodiments, able to read instructions 1424 from a machine-readable medium 1422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 14 shows the machine 1400 in the example form of a computer system (e.g., a computer) within which the instructions 1424 (e.g., software, a program, an application, an applet, an app, or other executable code) for causing the machine 1400 to perform any one or more of the methodologies discussed herein may be executed, in whole or in part.

In alternative embodiments, the machine 1400 operates as a standalone device or may be communicatively coupled (e.g., networked) to other machines. In a networked deployment, the machine 1400 may operate in the capacity of a server machine or a client machine in a server-client network environment, or as a peer machine in a distributed (e.g., peer-to-peer) network environment. The machine 1400 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1424, sequentially or otherwise, that specify actions to be taken by that machine. Further, while only a single machine is illustrated, the term "machine" shall also be taken to include any collection of machines that individually or jointly execute the instructions 1424 to perform all or part of any one or more of the methodologies discussed herein.

The machine 1400 includes a processor 1402 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1404, and a static memory 1406, which are configured to communicate with each other via a bus 1408. The processor 1402 contains solid-state digital microcircuits (e.g., electronic, optical, or both) that are configurable, temporarily or permanently, by some or all of the instructions 1424 such that the processor 1402 is configurable to perform any one or more of the methodologies described herein, in whole or in part. For example, a set of one or more microcircuits of the processor 1402 may be configurable to execute one or more modules (e.g., software modules) described herein. In some example embodiments, the processor 1402 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1400 with at least the processor 1402, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1400 may further include a graphics display 1410 (e.g., a plasma display panel (PDP), a light emitting diode (LED) display, a liquid crystal display (LCD), a projector, a cathode ray tube (CRT), or any other display capable of displaying graphics or video). The machine 1400 may also include an alphanumeric input device 1412 (e.g., a keyboard or keypad), a pointer input device 1414 (e.g., a mouse, a touchpad, a touchscreen, a trackball, a joystick, a stylus, a motion sensor, an eye tracking device, a data glove, or other pointing instrument), a data storage 1416, an audio generation device 1418 (e.g., a sound card, an amplifier, a speaker, a headphone jack, or any suitable combination thereof), and a network interface device 1420.

The data storage 1416 (e.g., a data storage device) includes the machine-readable medium 1422 (e.g., a tangible and non-transitory machine-readable storage medium) on which are stored the instructions 1424 embodying any one or more of the methodologies or functions described herein. The instructions 1424 may also reside, completely or at least partially, within the main memory 1404, within the static memory 1406, within the processor 1402 (e.g., within the processor's cache memory), or any suitable combination thereof, before or during execution thereof by the machine 1400. Accordingly, the main memory 1404, the static memory 1406, and the processor 1402 may be considered machine-readable media (e.g., tangible and non-transitory machine-readable media). The instructions 1424 may be transmitted or received over the network 190 via the network interface device 1420. For example, the network interface device 1420 may communicate the instructions 1424 using any one or more transfer protocols (e.g., hypertext transfer protocol (HTTP)).

In some example embodiments, the machine 1400 may be a portable computing device (e.g., a smart phone, a tablet computer, or a wearable device), and may have one or more additional input components 1430 (e.g., sensors or gauges). Examples of such input components 1430 include an image input component (e.g., one or more cameras), an audio input component (e.g., one or more microphones), a direction input component (e.g., a compass), a location input component (e.g., a GPS receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1424 for execution by the machine 1400, such that the instructions 1424, when executed by one or more processors of the machine 1400 (e.g., processor 1402), cause the machine 1400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1424 for execution by the machine 1400 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1424).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors, target motion data that describes geolocation movement of a target device;
determining, by the one or more processors, a target motion vector that indicates a target speed of the target device and that indicates a target direction in which the target device is moving at the target speed, the target motion vector being determined based on the accessed target motion data;
determining, by the one or more processors, a hologram motion vector that indicates a relative speed of a hologram to be generated and that indicates a relative direction of the hologram to be generated, the relative speed and the relative direction being relative to the target device; and
causing, by the one or more processors, a user device to generate the hologram and display an augmented reality scene in which the hologram moves at a hologram speed determined based on the target speed of the target device and on the relative speed of the hologram and moves in a hologram direction determined based on the target direction of the target device and on the relative direction of the hologram.

In some example embodiments, relative motion between devices is determined for purposes of hologram location. Accordingly, a second embodiment provides a method according to the first embodiment, wherein:
the accessed target motion data describes the geolocation movement of the target device relative to a planetary surface; and
the method further comprises:
accessing user motion data that describes geolocation movement of the user device relative to the planetary surface; and wherein
the determining of the target motion vector is further based on the accessed user motion data and determines a relative target motion vector that indicates a relative target speed of the target device relative to the user device and that indicates a relative target direction of the target device relative to the user device;
the hologram speed is a relative hologram speed of the hologram relative to the user device and is determined based on the relative target speed of the target device relative to the user device; and
the hologram direction is a relative hologram direction of the hologram relative to the user device and is determined based on the relative target direction of the target device relative to the user device.

In some example embodiments, geolocation data (e.g., global positioning system data) is directly used for hologram location. Accordingly, a third embodiment provides a method according to the first embodiment or the second embodiment, wherein:
the accessed target motion data describes the geolocation movement of the target device in relation to a planetary surface;
the hologram speed of the hologram is relative to the planetary surface; and
the hologram direction of the hologram is relative to the planetary surface.

In some example embodiments, the hologram speed and hologram direction are explicitly determined. Accordingly, a fourth embodiment provides a method according to any of the first through third embodiments, wherein:
the determining of the hologram motion vector includes determining a relative hologram motion vector by:
determining the hologram speed of the hologram based on the target speed of the target device and on the relative speed of the hologram; and
determining the hologram direction of the hologram based on the target direction of the target device and on the relative direction of the hologram.

In some example embodiments, the hologram is included in a field of view of a camera of the user device. Accordingly, a fifth embodiment provides a method according to any of the first through fourth embodiments, further comprising:
determining a field of view of a camera of the user device; and wherein
the causing of the user device to display the augmented reality scene includes causing the user device to display the generated hologram within the determined field of view of the camera of the user device.

Moreover, the field of view of the camera of the user device may include both the target device and the hologram. Accordingly, a sixth embodiment provides a method according to the fifth embodiment, further comprising:
accessing target position data that describes a geolocation of the target device; and
detecting that the geolocation of the target device is within the field of view of the camera of the user device; and wherein
the causing of the user device to display the augmented reality scene includes causing the user device to encompass the geolocation of the target device within the augmented reality scene based on the geolocation of the target device being detected within the determined field of view of the camera of the user device.

Alternatively, the field of view of the camera of the user device may omit the target device, despite the field of view including the hologram. Accordingly, a seventh embodiment provides a method according to the fifth embodiment, further comprising:
accessing target position data that describes a geolocation of the target device;
detecting that the target device is outside the field of view of the camera of the user device; and wherein
the causing of the user device to display the augmented reality scene includes causing the user device to omit the geolocation of the target device from the augmented reality scene based on the geolocation of the target device being detected outside the determined field of view of the camera of the user device.

In some example embodiments, the hologram is oriented based on the target direction of the target device. Accordingly, an eighth embodiment provides a method according to any of the first through seventh embodiments, wherein:
the causing of the user device to display the augmented reality scene includes causing the user device to display the hologram oriented based on the target direction in which the target device is moving.

Moreover, the hologram may have its own distinct orientation relative to the target direction of the target device. Accordingly, a ninth embodiment provides a method according to the eighth embodiment, further comprising:
determining a hologram orientation vector that indicates a relative orientation of the hologram relative to the target direction in which the target device is moving; and wherein
the causing of the user device to display the augmented reality scene includes causing the user device to display the hologram oriented further based on the relative orientation of the hologram relative to the target direction in which the target device is moving.

In some example embodiments, the hologram is just one hologram in a group of multiple holograms (e.g., one bird within a flock of birds, one space soldier within a squad of space soldiers, or one dragon within a flight of dragons), each with its own corresponding motion vector. Accordingly, a tenth embodiment provides a method according to any of the first through ninth embodiments, wherein:
the hologram is included in a group of holograms;
the determining of the hologram motion vector of the hologram is performed as part of determining a group of hologram motion vectors that each correspond to a different hologram in the group of holograms; and
the causing of the user device to display the augmented reality scene includes causing the user device to display the group of holograms, each hologram in the group being displayed based on its corresponding determined hologram motion vector.

Moreover, each hologram in the group of holograms may be separately oriented relative to the target direction of the target device. Accordingly, the eleventh embodiment provides a method according to the tenth embodiment, further comprising:
determining a group of hologram orientation vectors that each indicate a corresponding relative orientation of a different hologram in the group of holograms, each relative orientation being relative to the target direction in which the target device is moving; and wherein
the causing of the user device to display the group of holograms includes causing each hologram in the group to be oriented based on its corresponding relative orientation that is relative to the target direction in which the target device is moving.

In some example embodiments, the hologram is positionally offset in space relative to the target device. Accordingly, a twelfth embodiment provides a method according to any of the first through eleventh embodiments, further comprising:
accessing target position data that describes a geolocation of the target device; and
determining a relative offset vector that indicates a relative offset distance of the hologram and that indicates a relative offset direction of the hologram; and wherein
the causing of the user device to display the augmented reality scene includes causing the user device to display the hologram at the relative offset distance away from the geolocation of the target device and in the relative offset direction relative to the target direction in which the target device is moving.

Moreover, the positional offset of the hologram may be obtained from a database (e.g., a table stored in the database 115), such as by one or more lookup operations for static (e.g., time-invariant) information or by one or more API calls for dynamic (e.g., time-variant) information. Accordingly, a thirteenth embodiment provides a method according to the twelfth embodiment, wherein:
the determining of the relative offset vector includes:
accessing the relative offset distance of the hologram from a hologram database that correlates the relative offset distance with the hologram; and
accessing the relative offset direction of the hologram from the hologram database, the hologram database correlating the relative offset direction with the hologram.

In some example embodiments, the relative speed and relative direction of the hologram with respect to any target device is obtainable from a database (e.g., a table stored in the database 115), such as by one or more lookup operations for static (e.g., time-invariant) information or by one or more API calls for dynamic (e.g., time-variant) information. Accordingly, a fourteenth embodiment provides a method according to any of the first through thirteenth embodiments, wherein:
the determining of the hologram motion vector includes:
accessing the relative speed of the hologram from a hologram database that correlates the relative speed with the hologram; and
accessing the relative direction of the hologram from the hologram database, the hologram database correlating the relative direction with the hologram.

In some example embodiments, one or more portions of the augmented reality scene can be shared (e.g., via social media) from one user device to one or more other user devices. Accordingly, a fifteenth embodiment provides a method according to any of the first through fourteenth embodiments, wherein:

the user device is a first user device communicatively coupled to a second user device via a network; and the method further comprises:

causing the first user device to communicate at least a portion of the displayed augmented reality scene to the second device, the communicated portion depicting the hologram moving at the hologram speed determined based on the target speed of the target device and on the relative speed of the hologram and depicting the hologram moving in the hologram direction determined based on the target direction of the target device and on the relative direction of the hologram.

In some example embodiments, one or more portions of the augmented reality scene can be recorded by the user device (e.g., for storage by the user device or to a network-based data store, such as the database 115). Accordingly, a sixteenth embodiment provides a method according to any of the first through fifteenth embodiments, further comprising:

causing the user device to record at least a portion of the displayed augmented reality scene, the recorded portion depicting the hologram moving at the hologram speed determined based on the target speed of the target device and on the relative speed of the hologram and depicting the hologram moving in the hologram direction determined based on the target direction of the target device and on the relative direction of the hologram.

Moreover, a recorded portion of the augmented reality scene can then be shared (e.g., via social media, with or without editing by the user) from one user device to one or more other user devices. Accordingly, a seventeenth embodiment provides a method according to the sixteenth embodiment, wherein:

the user device is a first user device communicatively coupled to a second user device via a network; and the method further comprises:

causing the first user device to communicate the recorded portion of the displayed augmented reality scene to the second device.

In some example embodiments of a client-side implementation, an eighteenth embodiment provides a method according to any of the first through seventeenth embodiments, wherein:

the causing of the user device to generate the hologram and display the augmented reality scene includes accessing live camera data generated by a camera of the user device and generating composited video that depicts the hologram and at least some of the live camera data.

In some example embodiments of a server-side implementation, a nineteenth embodiment provides a method according to any of the first through seventeenth embodiments, wherein:

the causing of the user device to generate the hologram and display the augmented reality scene includes causing the user device to access live camera data generated by a camera of the user device and causing the user device to generate composited video that depicts the hologram and at least some of the live camera data.

A twentieth embodiment provides a machine-readable medium (e.g., a non-transitory machine-readable storage medium) comprising instructions that, when executed by one or more processors of a machine, cause the machine to perform operations comprising:

accessing target motion data that describes geolocation movement of a target device;

determining a target motion vector that indicates a target speed of the target device and that indicates a target direction in which the target device is moving at the target speed, the target motion vector being determined based on the accessed target motion data;

determining a hologram motion vector that indicates a relative speed of a hologram to be generated and that indicates a relative direction of the hologram to be generated, the relative speed and the relative direction being relative to the target device; and causing a user device to generate the hologram and display an augmented reality scene in which the hologram moves at a hologram speed determined based on the target speed of the target device and on the relative speed of the hologram and moves in a hologram direction determined based on the target direction of the target device and on the relative direction of the hologram.

A twenty-first embodiment provides a system (e.g., a computer system) comprising:

one or more processors; and a memory storing instructions that, when executed by at least one processor among the one or more processors, cause the system to perform operations comprising:

accessing target motion data that describes geolocation movement of a target device;

determining a target motion vector that indicates a target speed of the target device and that indicates a target direction in which the target device is moving at the target speed, the target motion vector being determined based on the accessed target motion data;

determining a hologram motion vector that indicates a relative speed of a hologram to be generated and that indicates a relative direction of the hologram to be generated, the relative speed and the relative direction being relative to the target device; and causing a user device to generate the hologram and display an augmented reality scene in which the hologram moves at a hologram speed determined based on the target speed of the target device and on the relative speed of the hologram and moves in a hologram direction determined based on the target direction of the target device and on the relative direction of the hologram.

As noted above, in some example embodiments, relative motion between devices is determined for purposes of hologram location. Accordingly, a twenty-second embodiment provides a system according to the twenty-first embodiment, wherein:

the accessed target motion data describes the geolocation movement of the target device relative to a planetary surface; and the operations further comprise:

accessing user motion data that describes geolocation movement of the user device relative to the planetary surface; and wherein the determining of the target motion vector is further based on the accessed user motion data and determines a relative target motion vector that indicates a relative target speed of the target device relative to the user device and that indicates a relative target direction of the target device relative to the user device;

the hologram speed is a relative hologram speed of the hologram relative to the user device and is determined based on the relative target speed of the target device relative to the user device; and the hologram direction is a relative hologram direction of the hologram relative to the user device and is determined based on the relative target direction of the target device relative to the user device.

A twenty-third embodiment provides a carrier medium carrying machine-readable instructions for controlling a machine to carry out the method of any one of the first through nineteenth embodiments.

What is claimed is:

1. A method comprising:
   detecting, by one or more processors, movement of a target device relative to a planet surface;
   determining, by the one or more processors, a target speed at which the target device is moving and a target direction in which the target device is moving;
   determining, by the one or more processors, a relative speed of a hologram to be displayed relative to the target device and a relative direction of the hologram to be displayed relative to the target device; and
   causing, by the one or more processors, a display device to display the hologram in motion relative to the planet surface at a hologram speed determined based on the target speed and on the relative speed and in a hologram direction determined based on the target direction and on the relative direction.

2. The method of claim 1, further comprising:
   accessing display motion data that describes movement of the display device relative to the planetary surface; and wherein:
   the determining of the target speed at which the target device is moving is based on the accessed display motion data and determines a relative target speed of the target device relative to the display device; and
   the determining of the relative speed of the hologram is based on the relative target speed of the target device relative to the display device.

3. The method of claim 1, wherein:
   accessing display motion data that describes movement of the display device relative to the planetary surface; and wherein:
   the determining of the target direction in which the target device is moving is based on the accessed display motion data and determines a relative target direction of the target device relative to the display device; and
   the determining of the relative direction of the hologram is based on the relative target direction of the target device relative to the display device.

4. The method of claim 1, further comprising:
   determining the hologram speed of the hologram based on the target speed at which the target device is moving and on the relative speed of the hologram; and
   determining the hologram direction of the hologram based on the target direction in which the target device is moving and on the relative direction of the hologram.

5. The method of claim 1, further comprising:
   determining a field of view of a camera communicatively coupled to the display device; and wherein:
   the causing of the display device to display the hologram includes causing the display device to display the hologram within the determined field of view of the camera communicatively coupled to the display device.

6. The method of claim 1, further comprising:
   accessing location data that describes a location of the target device; and
   detecting that the target device is within a field of view of a camera communicatively coupled to the display device; and wherein:
   the causing of the display device to display the hologram includes causing the display device to display an augmented reality scene that includes the location of the target device within the field of view of the camera communicatively coupled to the display device.

7. The method of claim 1, further comprising:
   accessing location data that describes a location of the target device; and
   detecting that the target device is outside a field of view of a camera communicatively, coupled to the display device; and wherein:
   the causing of the display device to display the hologram includes causing the display device to display an augmented reality scene that omits the location of the target device outside the field of view of the camera communicatively coupled to the display device.

8. The method of claim 1, wherein:
   the causing of the display device to display the hologram includes causing the display device to display the hologram in an orientation determined based on the target direction in which the target device is moving.

9. The method of claim 1, wherein:
   the hologram is included in a group of holograms;
   the determining of the relative speed of the hologram and of the relative direction of the hologram is performed as part of determining a group of motion vectors that each correspond to a different hologram in the group of holograms; and
   the causing of the display device to display the hologram is performed as part of causing the display device to display the group of holograms, each hologram in the group being displayed based on its corresponding determined motion vector.

10. The method of claim 1, further comprising:
    accessing location data that describes a location of the target device; and
    determining a relative offset vector that indicates a relative offset distance of the hologram and that indicates a relative offset direction of the hologram; and wherein:
    the causing of the display device to display the hologram includes causing the display device to display the hologram at the relative offset distance away from the location of the target device and in the relative offset direction relative to the target direction in which the target device is moving.

11. The method of claim 1, wherein:
    the determining of the relative speed of the hologram and the relative direction of the hologram includes:
    accessing the relative speed of the hologram from a database that correlates the relative speed with the hologram; and
    accessing the relative direction of the hologram from the database, the database correlating the relative direction with the hologram.

12. The method of claim 1, wherein:
    the display device is a first display device communicatively coupled to a second display device; and the method further comprises:
    causing the first display device to communicate at least a portion of an augmented reality scene to the second device, the communicated portion depicting the hologram in motion at the hologram speed relative to the planet surface and in the hologram direction relative to the planet surface.

13. The method of claim 1, wherein:
    causing the display device to record at least a portion of an augmented reality scene, the recorded portion depicting the hologram in motion at the hologram speed relative to the planet surface and in the hologram direction relative to the planet surface.

14. A non-transitory machine-readable storage medium comprising instructions that, when executed by one or more processors of a machine, cause the machine to perform operations comprising:
- detecting movement of a target device relative to a planet surface;
- determining a target speed at which the target device is moving and a target direction in which the target device is moving;
- determining a relative speed of a hologram to be displayed relative to the target device and a relative direction of the hologram to be displayed relative to the target device; and
- causing a display device to display the hologram in motion relative to the planet surface at a hologram speed determined based on the target speed and on the relative speed and in a hologram direction determined based on the target direction and on the relative direction.

15. The non-transitory machine-readable storage medium of claim 14, wherein the operations further comprise:
- determining the hologram speed of the hologram based on the target speed at which the target device is moving and on the relative speed of the hologram; and
- determining the hologram direction of the hologram based on the target direction in which the target device is moving and on the relative direction of the hologram.

16. The non-transitory machine-readable storage medium of claim 14, wherein the operations further comprise:
- accessing location data that describes a location of the target device; and
- detecting that the target device is within a field of view of a camera communicatively coupled to the display device; and wherein:
- the causing of the display device to display the hologram includes causing the display device to display an augmented reality scene that includes the location of the target device within the field of view of the camera communicatively coupled to the display device.

17. The non-transitory machine-readable storage medium of claim 14, wherein the operations further comprise:
- accessing location data that describes a location of the target device; and
- detecting that the target device is outside a field of view of a camera communicatively, coupled to the display device; and wherein:
- the causing of the display device to display the hologram includes causing the display device to display an augmented reality scene that omits the location of the target device outside the field of view of the camera communicatively coupled to the display device.

18. A system comprising:
one or more processors; and
a memory storing instructions that, when executed by at least one processor among the one or more processors, cause the system to perform operations comprising:
detecting movement of a target device relative to a planet surface;
determining a target speed at which the target device is moving and a target direction in which the target device is moving;
determining a relative speed of a hologram to be displayed relative to the target device and a relative direction of the hologram to be displayed relative to the target device; and
causing a display device to display the hologram in motion relative to the planet surface at a hologram speed determined based on the target speed and on the relative speed and in a hologram direction determined based on the target direction and on the relative direction.

19. The system of claim 18, wherein the operations further comprise:
- accessing location data that describes a location of the target device; and
- detecting that the target device is within a field of view of a camera communicatively coupled to the display device; and wherein:
- the causing of the display device to display the hologram includes causing the display device to display an augmented reality scene that includes the location of the target device within the field of view of the camera communicatively coupled to the display device.

20. The system of claim 18, wherein the operations further comprise:
- accessing location data that describes a location of the target device; and
- detecting that the target device is outside a field of view of a camera communicatively coupled to the display device; and wherein:
- the causing of the display device to display the hologram includes causing the display device to display an augmented reality scene that omits the location of the target device outside the field of view of the camera communicatively coupled to the display device.

* * * * *

UNITED STATES PATENT AND TRADEMARK OFFICE
CERTIFICATE OF CORRECTION

PATENT NO. : 11,036,182 B2  
APPLICATION NO. : 16/713869  
DATED : June 15, 2021  
INVENTOR(S) : Lincoln Gasking Page 1 of 1

It is certified that error appears in the above-identified patent and that said Letters Patent is hereby corrected as shown below:

In the Claims

In Column 28, Line 7, in Claim 7, delete "communicatively," and insert --communicatively-- therefor In Column 29, Line 45, in Claim 17, delete "communicatively," and insert --communicatively-- therefor Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*